US012646838B2

(12) United States Patent
Neenan et al.

(10) Patent No.: US 12,646,838 B2
(45) Date of Patent: Jun. 2, 2026

(54) ANTENNA SYSTEMS

(71) Applicant: Parsec Technologies, Inc., Plano, TX (US)

(72) Inventors: Michael A. Neenan, Plano, TX (US); Richard Loy Smith, Jr., Dallas, TX (US); George Alexander Bednekoff, Plano, TX (US); Rauhon Ahmed Shaik, Wylie, TX (US)

(73) Assignee: Parsec Technologies, Inc., Plano, TX (US)

( * ) Notice: Subject to any disclaimer, the term of this patent is extended or adjusted under 35 U.S.C. 154(b) by 84 days.

(21) Appl. No.: 18/438,362

(22) Filed: Feb. 9, 2024

(65) Prior Publication Data

US 2025/0079704 A1 Mar. 6, 2025

Related U.S. Application Data

(60) Provisional application No. 63/584,445, filed on Sep. 21, 2023, provisional application No. 63/580,930, filed on Sep. 6, 2023.

(51) Int. Cl.
*H01Q 5/20* (2015.01)
*H01Q 1/08* (2006.01)
(Continued)

(52) U.S. Cl.
CPC ............... *H01Q 5/20* (2015.01); *H01Q 1/085* (2013.01); *H01Q 1/42* (2013.01); *H01Q 1/48* (2013.01); *H01Q 21/28* (2013.01)

(58) Field of Classification Search
CPC ............ H01Q 1/085; H01Q 1/42; H01Q 1/48; H01Q 5/20; H01Q 21/28
See application file for complete search history.

(56) References Cited

U.S. PATENT DOCUMENTS

| | | | |
|---|---|---|---|
| 5,966,102 | A | 10/1999 | Runyon |
| 6,067,053 | A | 5/2000 | Runyon |

(Continued)

FOREIGN PATENT DOCUMENTS

| | | |
|---|---|---|
| CN | 102097674 | 6/2011 |
| CN | 102468529 | 5/2012 |

(Continued)

OTHER PUBLICATIONS

Balling et al., "Broadband Dual Polarized Antenna Arrays for Mobile Communication Applications", 33rd European Microwave Conference Proceedings IEEE, Oct. 7, 2003, Munich, Germany, p. 1-4.

*Primary Examiner* — Daniel Munoz
(74) *Attorney, Agent, or Firm* — Knobbe, Martens, Olson & Bear, LLP

(57) ABSTRACT

An antenna assembly can include a cover, an internal ground plane, and a multi-band antenna. The cover can comprise one or more walls. The internal ground plane can comprise a base of the antenna assembly and can be coupled to the cover. The multi-band antenna can comprise one or more radiating elements comprising a first radiating element formed on a first PCB portion, the first radiating element comprising a first upright radiating portion and a first head radiating portion. The first radiating element can be configured to move from a first configuration prior to engagement with the cover to a second configuration when the cover is coupled to the internal ground plane. In the first configuration, the first upright radiating portion is coplanar to the first head radiating portion. In the second configuration, the first upright radiating portion is at an angle relative to the first head radiating portion.

20 Claims, 6 Drawing Sheets

(51) Int. Cl.

| | |
|---|---|
| ***H01Q 1/42*** | (2006.01) |
| ***H01Q 1/48*** | (2006.01) |
| ***H01Q 21/28*** | (2006.01) |

(56) References Cited

U.S. PATENT DOCUMENTS

| | | | |
|---|---|---|---|
| 6,111,550 | A | 8/2000 | Miller et al. |
| 9,379,453 | B2 | 6/2016 | Rentz |
| 10,224,615 | B2 | 3/2019 | Wu |
| 10,312,583 | B2 * | 6/2019 | Ng ......................... H01Q 21/28 |
| 11,251,539 | B2 | 2/2022 | Hinman |
| 11,283,149 | B2 | 3/2022 | Neenan et al. |
| 11,329,363 | B1 | 5/2022 | Neenan et al. |
| 11,658,382 | B2 | 5/2023 | Neenan et al. |
| 11,664,574 | B2 | 5/2023 | Neenan et al. |
| 11,909,090 | B2 | 2/2024 | Neenan et al. |
| 11,936,094 | B2 | 3/2024 | Neenan et al. |
| 12,057,641 | B2 | 8/2024 | Neenan et al. |
| 12,212,035 | B2 | 1/2025 | Neenan et al. |
| 12,266,845 | B2 | 4/2025 | Neenan et al. |
| 2010/0253584 | A1 | 10/2010 | Yang et al. |
| 2011/0080323 | A1 | 4/2011 | Thiam |
| 2011/0102278 | A1 | 5/2011 | Rozan |
| 2012/0146872 | A1 | 6/2012 | Chainon et al. |
| 2012/0280882 | A1 | 11/2012 | Zimmerman |
| 2014/0139387 | A1 | 5/2014 | Jones et al. |
| 2014/0375507 | A1 | 12/2014 | Lin et al. |
| 2015/0042521 | A1 | 2/2015 | Hazen |
| 2015/0102974 | A1 | 4/2015 | Stoytchev et al. |
| 2016/0172750 | A1 | 6/2016 | Ng |
| 2016/0248148 | A1 | 8/2016 | Hill et al. |
| 2016/0277062 | A1 | 9/2016 | Cheon et al. |
| 2016/0285161 | A1 | 9/2016 | Apaydin et al. |
| 2017/0062952 | A1 | 3/2017 | Sundararajan |
| 2017/0237158 | A1 | 8/2017 | Gibson et al. |
| 2017/0317428 | A1 * | 11/2017 | Petropoulos ......... H01Q 21/065 |
| 2017/0324171 | A1 | 11/2017 | Shehan |
| 2017/0358842 | A1 | 12/2017 | Shehan |
| 2018/0062731 | A1 | 3/2018 | Ng et al. |
| 2018/0083348 | A1 | 3/2018 | Thiam et al. |
| 2018/0109006 | A1 * | 4/2018 | Ng ......................... H01Q 1/405 |
| 2018/0323513 | A1 | 11/2018 | Varnoosfaderani et al. |
| 2019/0148825 | A1 | 5/2019 | Huerta et al. |
| 2019/0237850 | A1 | 8/2019 | Fleischer et al. |
| 2019/0305406 | A1 | 10/2019 | Williams |
| 2019/0341674 | A1 | 11/2019 | Rosenthal et al. |
| 2019/0356051 | A1 | 11/2019 | Barrera et al. |
| 2020/0112101 | A1 | 4/2020 | Yun |
| 2020/0350664 | A1 | 11/2020 | Thill |
| 2020/0373668 | A1 | 11/2020 | Wu |
| 2020/0411972 | A1 | 12/2020 | Hicks et al. |
| 2021/0305718 | A1 | 9/2021 | Li |
| 2021/0391655 | A1 | 12/2021 | Brobston et al. |
| 2022/0384966 | A1 | 12/2022 | Chiang et al. |
| 2023/0145053 | A1 | 5/2023 | Kilbury et al. |
| 2023/0223709 | A1 | 7/2023 | Guntupalli |
| 2023/0402732 | A1 | 12/2023 | Neenan et al. |
| 2024/0097339 | A1 | 3/2024 | Khatua |
| 2024/0113450 | A1 | 4/2024 | Neenan et al. |
| 2024/0113451 | A1 | 4/2024 | Neenan et al. |
| 2024/0128644 | A1 | 4/2024 | Neenan et al. |
| 2024/0304958 | A1 | 9/2024 | Matsumura |
| 2025/0079683 | A1 | 3/2025 | Neenan et al. |
| 2025/0087905 | A1 | 3/2025 | Neenan et al. |
| 2025/0105530 | A1 | 3/2025 | Neenan et al. |
| 2025/0158281 | A1 | 5/2025 | Neenan et al. |
| 2025/0158289 | A1 | 5/2025 | Neenan et al. |
| 2025/0167445 | A1 | 5/2025 | Neenan et al. |
| 2025/0167459 | A1 | 5/2025 | Neenan et al. |
| 2025/0233306 | A1 | 7/2025 | Neenan et al. |
| 2025/0233307 | A1 | 7/2025 | Neenan et al. |
| 2025/0260160 | A1 | 8/2025 | Neenan et al. |

FOREIGN PATENT DOCUMENTS

| | | |
|---|---|---|
| CN | 203562507 | 4/2014 |
| CN | 105281049 | 1/2016 |
| CN | 210806018 | 6/2020 |
| CN | 212303910 | 1/2021 |
| CN | 114465021 | 5/2022 |
| CN | 116151285 | 5/2023 |
| DE | 202017002307 U1 | 8/2017 |
| EP | 0 349 499 | 1/1990 |
| EP | 3 474 376 | 4/2019 |
| EP | 3 614 491 | 2/2020 |
| KR | 102260880 | 6/2021 |
| WO | WO 2005/062422 | 7/2005 |
| WO | WO 2013/090783 | 6/2013 |
| WO | WO 2018/140305 | 8/2018 |
| WO | WO 2020/010039 | 1/2020 |
| WO | WO 2023/128683 | 7/2023 |
| WO | WO 2024/035801 | 2/2024 |
| WO | WO 2024/035805 | 2/2024 |
| WO | WO 2024/035810 | 2/2024 |
| WO | WO 2025/072367 | 9/2024 |
| WO | WO 2025/072213 | 4/2025 |
| WO | WO 2025/072553 | 4/2025 |

* cited by examiner

ANTENNA SYSTEMS

INCORPORATION BY REFERENCE TO ANY PRIORITY APPLICATIONS

The present application claims priority benefit to U.S. Provisional Application No. 63/584,445, filed Sep. 21, 2023, entitled "ANTENNA SYSTEMS," and U.S. Provisional Application No. 63/580,930, filed Sep. 6, 2023, entitled "ANTENNA SYSTEMS," each of which is hereby incorporated by reference herein in its entirety. Any and all applications for which a foreign or domestic priority claim is identified in the Application Data Sheet as filed with the present application are hereby incorporated by reference under 37 CFR 1.57 and made a part of this specification.

BACKGROUND

Field

The present disclosure relates to the field of wireless broadband communication, and more particularly to antenna systems and antennas that cover multiple frequency bands used in the telecommunication wireless spectrum.

Description of the Related Art

Over the last few decades, 3GPP as a collaborative organization has developed protocols for mobile telecommunications. The latest operational standard is known as 5G. Wireless communication relies on a variety of radio components including radio antennas that are used for transmitting and receiving information via electromagnetic waves. To communicate to specific devices without interference from other devices, radio transceivers and receivers communicate within a dedicated frequency bandwidth and have associated antennas that are configured to electromagnetically resonate at frequencies within the dedicated bandwidth. As more wireless devices are used on a frequency bandwidth, a communication bottleneck occurs as wireless devices compete for frequency channels within a dedicated bandwidth. 3GPP frequency bands range from 450 MHz to 8 GHz and beyond, however, antennas configured to resonate within this spectrum only resonate below 8 GHz for mobile 3GPP telecommunication standards. To capture a greater portion of the 3GPP or other telecommunication spectrum, either an antenna array of various antenna configurations is used, or a single geometrically complex antenna can be used. An antenna array, in most instances, takes up too much space and is therefore impractical for small devices, but employing a single antenna will have a useable bandwidth that is limited by its geometrical configuration. In one example, a known antenna configuration permits a 700 MHz-2.7 GHz frequency band; however, a single antenna configuration that permits a wider frequency band is desired. Additionally, it can be difficult and expensive to manufacture, assemble, and procure materials for components of antenna array systems. This may result in a system with poor functionality and/or coverage.

SUMMARY

In some aspects, the techniques described herein relate to an antenna assembly including: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a plurality of radiating elements comprising: a first cellular radiating element formed on a first PCB portion, the first cellular radiating element comprising a first upright radiating portion and a first head radiating portion; a second cellular radiating element formed on a second PCB portion, the second cellular radiating element comprising a second upright radiating portion and a second head radiating portion; and a WiFi radiating element formed on a third PCB portion; wherein the first cellular radiating element and the second cellular radiating element are configured to move from a first configuration prior to engagement with the cover to a second configuration when the cover is coupled to the internal ground plane, wherein in the first configuration the first upright radiating portion is coplanar to the first head radiating portion and the second upright radiating portion is coplanar to the second head radiating portion, wherein in the second configuration, the first upright radiating portion is at an angle relative to the first head radiating portion and the second upright radiating portion is at an angle relative to the second head radiating portion.

In some aspects, the techniques described herein relate to a method of assembling an antenna assembly, the method comprising: coupling one or more radiating elements in a first configuration to an internal ground plane; and positioning a cover on the internal ground plane, with the one or more radiating elements positioned between the cover and the internal ground plane, wherein positioning the cover on the internal ground plane causes at least a first radiating element of the one or more radiating elements to move to a second configuration, wherein in the first configuration, the first radiating element is substantially flat, wherein in the second configuration, the first radiating element has a three-dimensional shape.

In some aspects, the techniques described herein relate to an antenna assembly including: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a one or more radiating elements comprising: a first radiating element formed on a first PCB portion, the first radiating element comprising a first upright radiating portion and a first head radiating portion; wherein the first radiating element is configured to move from a first configuration prior to engagement with the cover to a second configuration when the cover is coupled to the internal ground plane, wherein in the first configuration the first upright radiating portion is coplanar to the first head radiating portion, wherein in the second configuration, the first upright radiating portion is at an angle relative to the first head radiating portion.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions in so far as they do not depart from the spirit and scope of the present application.

BRIEF DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
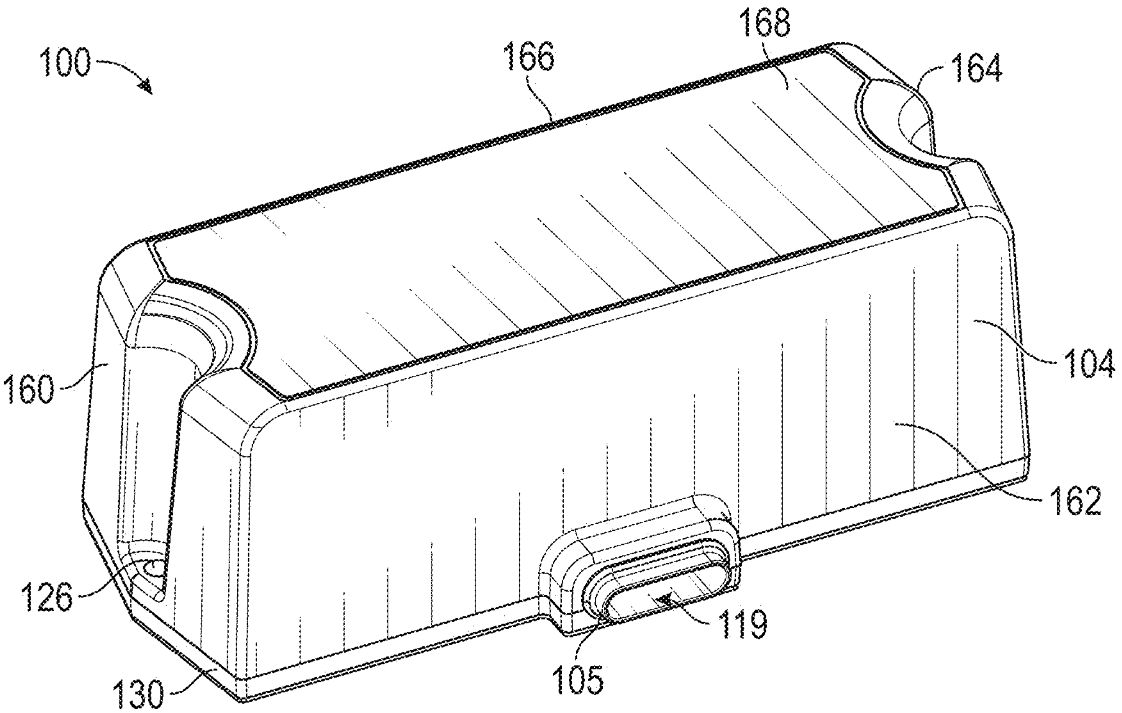
FIG. 1 illustrates a perspective view of an antenna assembly that includes a multi-element multi-band antenna enveloped by a non-conductive cover, according to some embodiments.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system and method in accordance with the present disclosure overcomes one or more of the above-discussed problems commonly associated with traditional antenna systems. In particular, the system of the present disclosure is an antenna system having a radome, a formed multi-band radiating elements supported on flexible printed circuit board (PCB) structures configured and adapted to be housed within the radome such that four bent PCB portions are positioned in a bent orientation during assembly. The PCB portions of the radiating element are paired with a formed ground plane that permits a frequency range of 450 MHz to 8 GHz, which provides a wider range of frequencies than antenna systems currently known in the art, with improved cost effectiveness and simplicity of manufacture. The four bent PCB portions allow for the antenna to be compact, making it ideal for compact 3GPP or other telecommunication transmitters. These and other unique features of the system are discussed below and illustrated in the accompanying drawings.

The system and method will be understood, both as to its structure and operation, from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described. As used herein, "system" and "assembly" are used interchangeably. It should be noted that the articles "a", "an", and "the", as used in this specification, include plural referents unless the content clearly dictates otherwise. Dimensions provided herein provide for an exemplary embodiment, however, alternate embodiments having scaled and proportional dimensions of the presented exemplary embodiment are also considered. Additional features and functions are illustrated and discussed below.

Figure 6A:
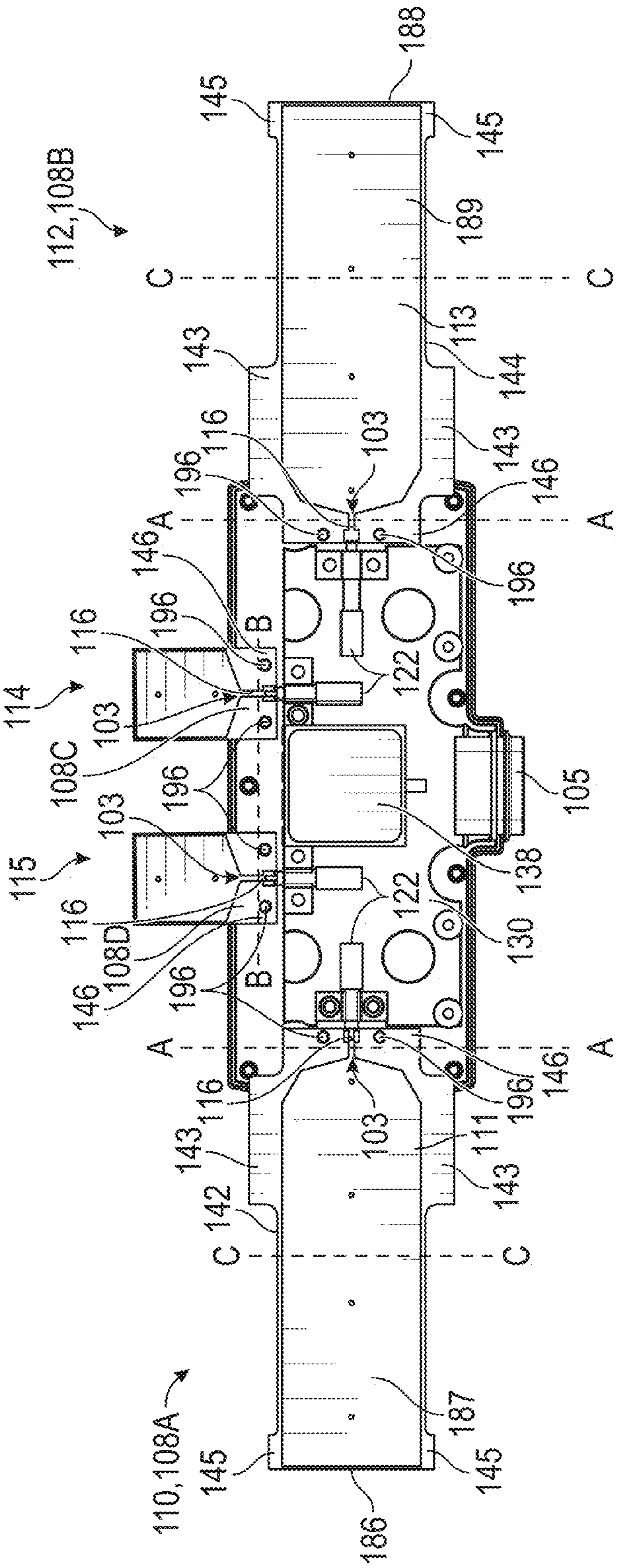
FIGS. 6A-6C illustrate perspective views of the antenna assembly of FIG. 1 with the non-conductive cover removed and the multi-band multi-element antenna in various assembly configurations.
Figure 6B:
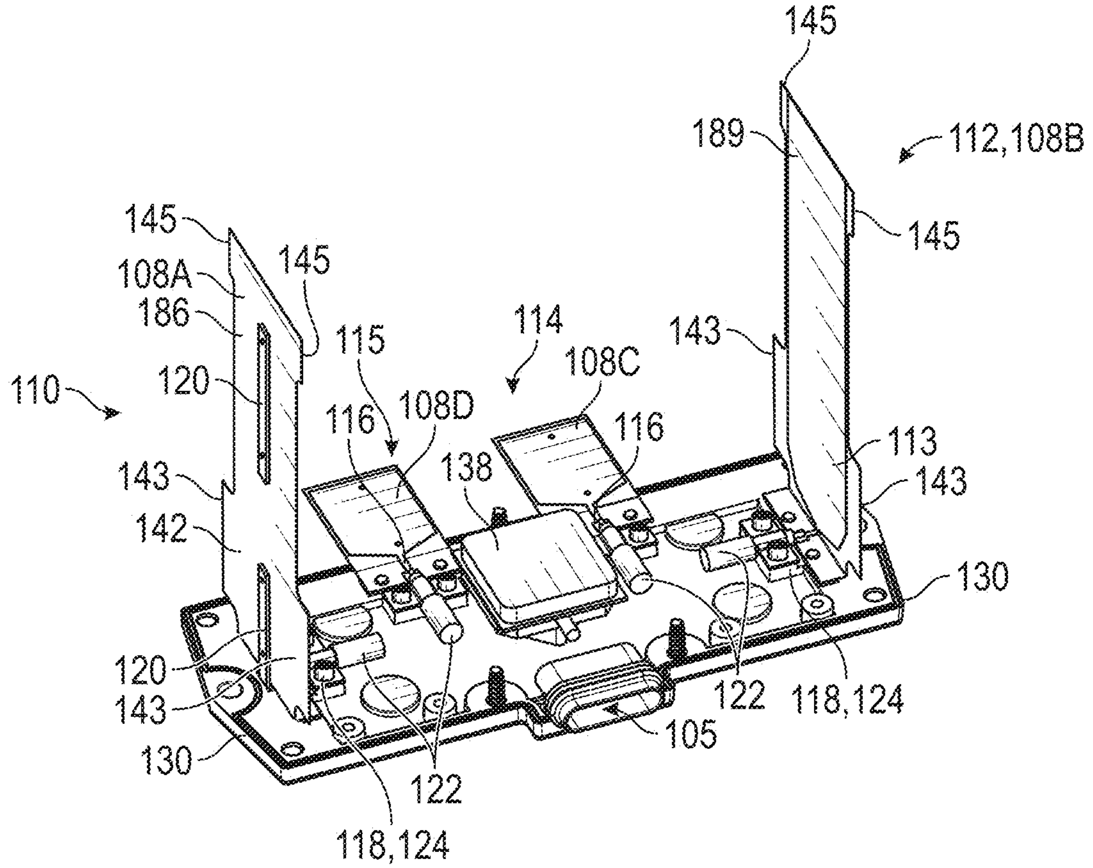
Figure 6C:
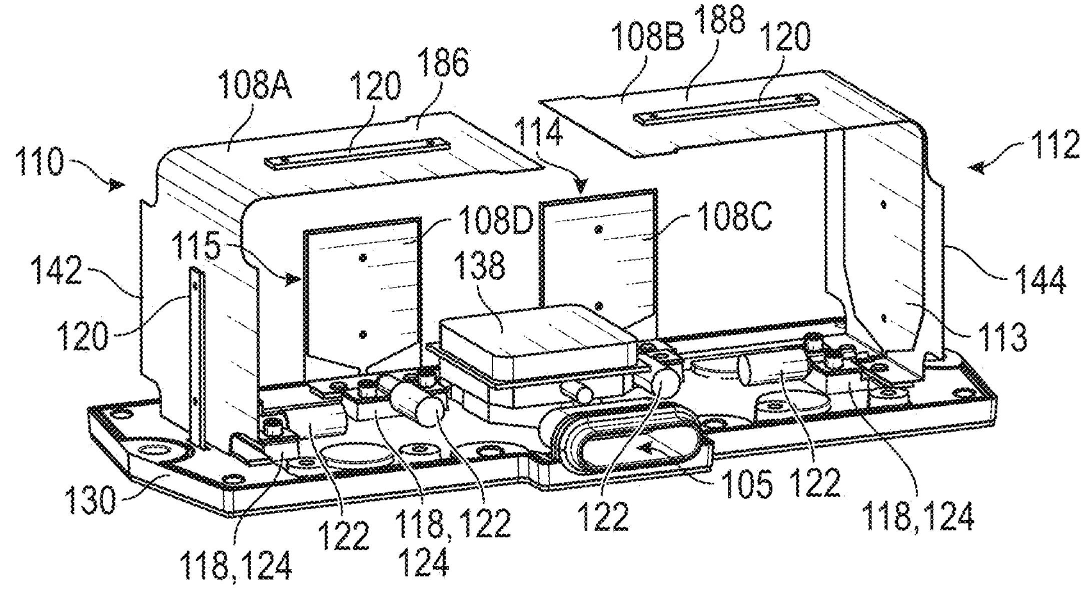
Figure 7:
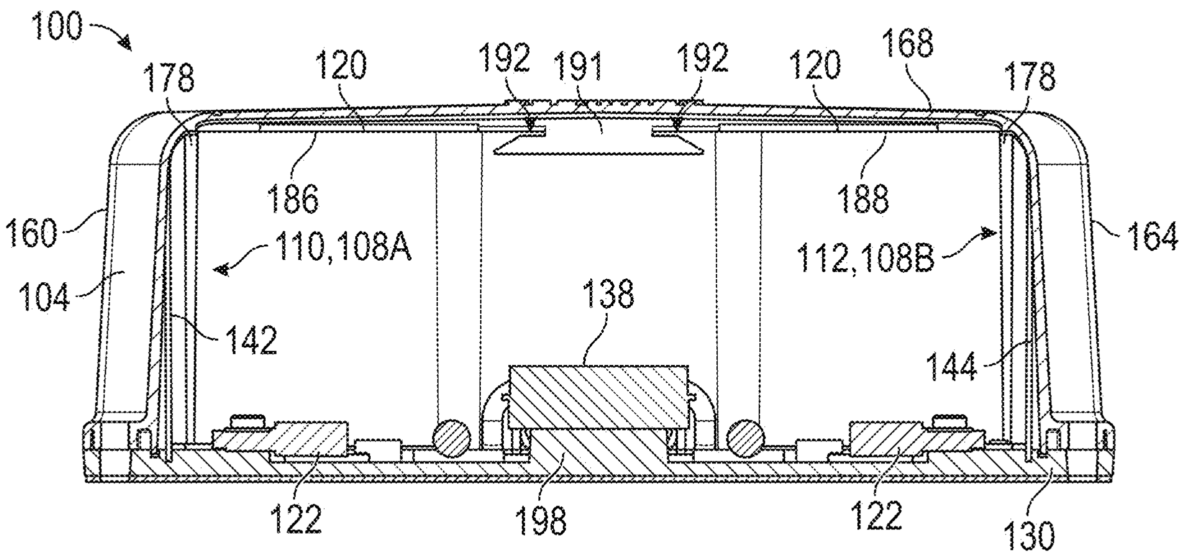
FIG. 7 illustrates a section view of the antenna assembly of FIG. 1 taken along the line 7-7 in FIG. 2.
Figure 8:
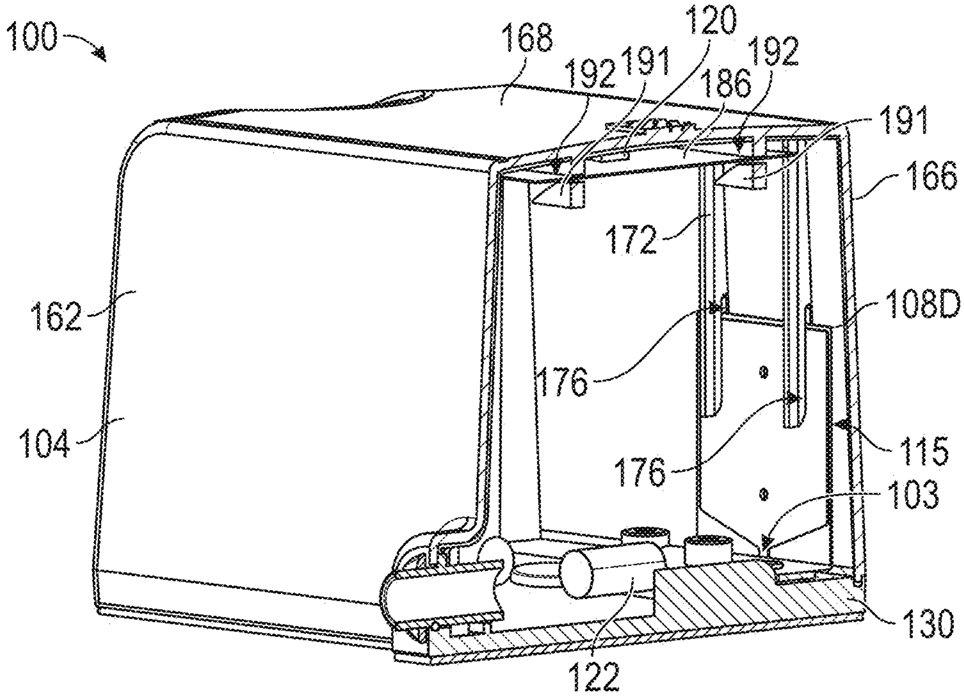
FIG. 8 illustrates a section view of the antenna assembly of FIG. 1 taken along the line 8-8 in FIG. 2.

Referring now to the drawings wherein like reference characters identify corresponding or similar elements in form and function throughout the several views. FIG. 1 illustrates a top perspective view of an antenna assembly that can include a multi-element multi-band antenna enveloped by a non-conductive cover. FIGS. 2-5 illustrate various views of components of the antenna assembly, according to some embodiments. FIGS. 6A-6C illustrate the antenna assembly with the multi-element multi-band antenna in various assembly configurations, according to some embodiments. FIGS. 7 and 8 illustrate section views of the antenna assembly, according to some embodiments.

According to some embodiments, features and aspects of this disclosure, a multi-band antenna system can be a multi-band monopole antenna system that has a configuration that, when used in conjunction with high order electromagnetic modes generated or received by a transceiver and/or receiver, permit the multi-element multi-band antenna system to have an operating frequency range of between about 450 MHz to about 8 GHz. A radome can be advantageously configured and adapted to have ribs, slots, catch points, and/or the like features within an interior portion of the radome to hold the radiating elements of the antenna in place for proper mechanical alignment during the fabrication of the antenna. Proper mechanical alignment can ensure that the radiating elements are held in their proper place so that the antenna meets it desired electrical performance for return loss and radiation patterns over the desired frequency bands. Flex circuit support portions and/or PCB portions can be made of polyimide or other similar flexible material and can support copper features of one or more radiating elements etched into its structure. The curved features of the flex circuits can be preferably and advantageously obtained during the installation of the flex circuits into the radome due to the unique ribbing and configuration of the interior of the radome such that portions of the flex circuits are bent during manufacturing upon insertion into the radome. The two shorter of the four radiating elements can be configured and adapted to be used for communication between about 1 GHz to about 8 GHz. The two tall radiating elements can be configured and adapted to be used for communication between about 450 MHz to about 8 GHZ. The radiating elements are similar in nature to what is commonly known as a monopole antenna. According to some embodiments, systems, and methods, antenna systems disclosed herein present exceptional performance given the volume and profile of the antenna system. The cubic inches of the enclosed space in the radome provide for an advantageous height of the radome above the groundplane. Microstrip transmission lines are used between the coaxial cable conductors and the radiating elements. The coaxial cable conductors can be positioned at or near the radiating elements to reduce a length of the microstrip transmission lines. The antenna system comprises a plurality of monopole antenna elements for all bands including the cellular antenna elements. The 3D forming of the antenna elements (that are constructed from flex circuits) by the radome during the assembly process advantageously reduces manufacturing time and expense and provides for properly shaped and positioned antenna elements for a single band as well as a multi-band application. According to some methods, antenna elements are positioned within the radome during manufacturing. While positioning the antenna elements into the radome, the antenna elements are formed into position for use in the desired communication configuration. The interior surfaces of the radome as well as the flat sheets of flex material are configured and adapted such that during the installation of the flex material into the radome, the radome forms the flat sheets of flex material into an “L” shape, a “C” shape, or another suitable and desired three-dimensional shape. Additionally, according to some embodiments, a single thread faster can be used per cable clamp to reduce the number of components and reduce labor costs as well.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

Objects that are coupled together can be permanently connected together or releasably connected together. Objects that are permanently connected together can be formed out of one sheet of material or multiple sheets of material. The type of connection can provide different means for the realization of particular advantages and/or convenience consistent with the suitable function and performance of the device.

Figure 3:
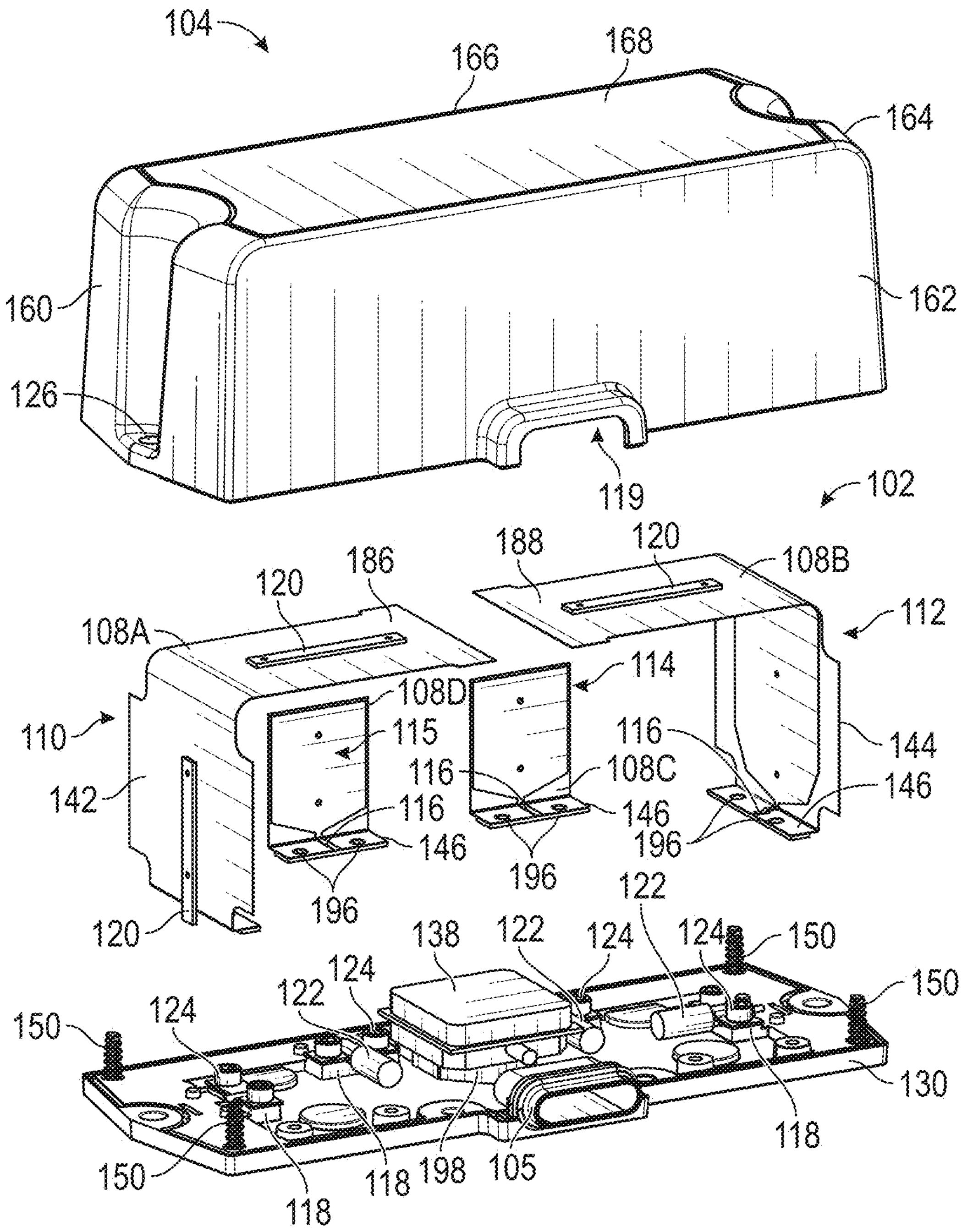
FIG. 3 illustrates an exploded view of the antenna assembly of FIG. 1.

With reference to FIG. 1, a perspective view of an antenna assembly 100 is illustrated in accordance with an embodiment of the present disclosure. The antenna assembly 100 may include a multi-element multi-band antenna 102, as shown in FIG. 3. The multi-element multi-band antenna 102 may be configured to provide wireless internet connectivity for a plurality of uses (e.g., data, voice communication, and/or the like). The antenna assembly 100 may have particular benefits when used in places such as kiosks and vehicles, however, the multi-element multi-band antenna 102 may be used in a wide range of applications. For example, the antenna assembly 100 may be a fixed or transportable solution, such as a hot spot accessory. In another example, the antenna assembly 100 can be used to provide cellular backup for internet connectivity for server rooms. Additionally, the antenna assembly 100 can be used for utility monitoring, last mile wireless internet for homes, small offices, and courtyards, to fill a coverage hole in the WiFi network, as a portable or fixed WiFi hot spot for multiple IOT devices, and/or the like. The multi-element multi-band antenna 102 may have a smaller volume and profile when compared to other antenna systems. For example, the multi-element multi-band antenna 102 housed in the radome 104 (as described below) may have a cubic volume of about 25.5 cubic inches. In other examples, the multi-element multi-band antenna 102 housed in the radome 104 may have a cubic volume between 6 and 30 cubic inches (e.g., between 6 and 30 cubic inches, 15 and 25 cubic inches, 18 and 23 cubic inches, values between the foregoing, etc.). The antenna assembly 100 can be a IP67-rated antenna that can be easy to install on kiosks, POTS replacement boxes, and/or other equipment using a magnetic or adhesive base. In some implementations, the antenna assembly 100 can include a screw on option for secured mounting.

In some embodiments, the antenna assembly 100 may be mounted on a client ground plane (not shown). The client ground plane may be in the form of conducting surfaces on vehicles, buildings, indoor or outdoor equipment enclosures, and other such customer premise equipment. Those skilled in the art would understand that the nature of the deployment of the antenna assembly 100 will change slightly in the deployed performance based on type of structure the antenna assembly 100 is attached to as well as the surroundings in which it is deployed. Those skilled in the art realize that the lower frequency bands of the multi-element multi-band antenna 102 may have optimal performance when placed on a client ground plane but that a client ground plane is not required for all applications, particularly where a reduction in the level of performance is acceptable. Accordingly, in some embodiments, the client ground plane is not required.

FIG. 3 illustrates an exploded view of the antenna assembly 100. The antenna assembly 100 can include the multi-element multi-band antenna 102, the radome 104 (also referred to herein as the "cover" 104 and the "non-conductive cover" 104), and an internal ground plane 130. The internal ground plane 130 can act as the base for the antenna assembly 100. The components of the multi-element multi-band antenna 102 may be concealed and/or secured within the radome 104 and may be positioned between the radome 104 and the internal ground plane 130. As shown in at least FIGS. 3 and 6A-6C, the multi-element multi-band antenna 102 may include one or more of the following components: a first radiating element 110, a second radiating element 112, a third radiating element 114, a fourth radiating element 115, and/or a GPS antenna 138. The antenna assembly 100 may include additional components to enable the function of the multi-element multi-band antenna 102, as described herein. To secure the multi-element multi-band antenna 102 within the antenna assembly 100, the radome 104 can be coupled to the internal ground plane 130. For example, the antenna assembly 100 may include a plurality of fasteners 150 to secure the internal ground plane 130 to the radome 104. The radome 104 may include a cable opening 119 to facilitate connection of coaxial cables (not shown) to the multi-element multi-band antenna 102. The terminated coaxial cables 122 may be positioned in interior of the multi-element multi-band antenna 102 (i.e., between the radome 104 and the internal ground plane 130) so that the coaxial cables extend out of the antenna assembly 100 through the cable opening 119.

The internal ground plane 130 can serve as a ground plane for the multi-element multi-band antenna 102. For example, the internal ground plane 130 can serve as an electrical reference point for operation of the multi-element multi-band antenna 102. In some embodiments, the internal ground plane 130 establishes a surface for the coaxial cables to use as a reference for continuation of the signal from the radio to the radiating elements 110, 112, 114, 115.

The radiating elements (e.g., radiating elements 110, 112, 114, 115) of the multi-element multi-band antenna 102 may also be referred to herein as "radiating antenna elements", "antenna elements" and "radiating portions". The radiating elements can be constructed of any suitable antenna material, such as metal, PCB substrates with conductive traces, dielectric materials, plastics with conductive coatings, ceramics, composite materials, and/or the like. In the illustrated example, the radiating elements comprise portions of PCB substrates with conductive features. For example, each radiating element can include a PCB portion 108. The PCB portions 108 may be made of flexible substrate materials (e.g., polyimide) that acts as the non-conductive support material and may include and a ductile copper or other suitable conductive material for the electrically conductive features. As such, the PCB portions 108 may be flex circuits. The PCB portions 108 may provide structure for the radiating elements 110, 112, 114, 115 of the multi-element multi-band antenna 102. For example, conductive material may be etched into the structure of the PCB portions 108 to form the radiating elements 110, 112, 114, 115. In some embodiments, the multi-element multi-band antenna 102 may include a plurality of the PCB portions 108 extending from the internal ground plane 130. As such, the multi-element multi-band antenna 102 is a three-dimensional antenna, as opposed to a two-dimensional antenna, which may provide certain benefits. For example, having a three-dimensional antenna can reduce the overall size of the antenna assembly 100 when compared to a two-dimensional antenna, while still maintaining the effectiveness of the multi-element multi-band antenna 102. In some implementations, it is desirable to make the multi-element multi-band antenna 102 as compact as possible. Having three-dimensional antenna can help reduce the overall size of the multi-element multi-band antenna 102, which is desirable in some use cases, particularly when it is not desirable to see the antenna assembly 100. The multi-element multi-band antenna 102 may be a multi-band monopole antenna that has a configuration that, when used in conjunction with high order electromagnetic modes generated or received by a transceiver and/or receiver, permit the multi-element multi-band antenna 102 to have an operating frequency range of 450 MHz to 8 GHZ.

The number of PCB portions 108 included in the antenna assembly 100 may be defined by the number of radiating elements included in the multi-element multi-band antenna 102. For example, in the illustrated embodiments, the multi-element multi-band antenna 102 includes a first PCB portion 108A, a second PCB portion 108B, a third PCB portion 108C, and a fourth PCB portion 108D (collectively PCB portions 108). However, more or less PCB portions 108 are possible. The PCB portions 108 may be coupled to the internal ground plane 130. The PCB portions 108 may extend from the internal ground plane 130 in a generally vertical direction when the antenna assembly 100 is assembled. The PCB portions 108 may extend from the internal ground plane 130 at approximately 90-degree angles in accordance with some embodiments. In some embodiments, PCB portions 108 may extend from internal ground plane 130 at an angle between 85-degrees and 95-degrees (e.g., between 85 and 95 degrees, 87 and 93 degree, 89 and 91 degrees, values between the foregoing, etc.).

The PCB portions 108 may be sized based on the desired size and function of the different radiations elements 110, 112, 114, 115 included in the multi-element multi-band antenna 102. For example, the first and second radiating elements 110, 112 may be configured for cellular communication. Accordingly, the first and second radiating elements 110, 112 may be referred to as "cellular radiating elements" or "cellular antennas". The third and fourth radiating elements 114, 115, may be configured as WiFi radios. Accordingly, the third and fourth radiating elements 114, 115 may be referred to as "WiFi antennas" or "WiFi radiating elements". Due to the different functions of the different radiating elements, the first and second PCB portions 108A, 108B may be a different size and shape than the third and fourth PCB portions 108C, 108D. In some implementations, the cellular radiating elements 110, 112 may be used for communication between approximately 450 MHz and 8 GHz. For example, the first and second radiating elements 110, 112 may be able to operate at low bands, mid bands, and high bands. In other embodiments, different frequency ranges are possible. Similarly, in some embodiments, the WiFi radiating elements 114, 115 may be used for communication between approximately 1 GHz and 8 GHz. For example, the radiating elements 114, 115 may be able to operate at mid band and high band. In other embodiments, different frequency ranges are possible. The radiating elements 110, 112, 114, 115 may be/function as monopole antennas. In some embodiments, each radiating elements 110, 112, 114, 115 covers the full bandwidth of the radio that is connected to it, with each radiating elements 110, 112, 114, 115 having a unique radio. The four radiating elements 110, 112, 114, 115 can work together in a Multiple-Input Multiple-Output ("MiMo") aspect of the radio link.

In accordance with some embodiments, the first and second PCB portions 108A, 108B may be bent or have a three-dimensional configuration. For example, each PCB portion 108A, 108B may include an upright PCB portion and a top PCB portion, with the conductive material of the radiating element formed on both the upright and top PCB portions. For example, in the illustrated embodiment, the first PCB portion 108A can include a first upright PCB portion 142 and a first top PCB portion 186, as shown in FIG. 3. Similarly, the second PCB portion 108B can include a second upright PCB portion 144 and a second top PCB portion 188. The top PCB portions 186, 188 may be horizontal extensions extending from the upright PCB portions 142, 144 respectively. In some embodiments, the top portions 186, 188 extend at approximately a 90-degree angle from the upright PCB portions 142, 144 in a direction over the internal ground plane 130 and towards each other. The 90-degree angle may follow a curved path between the upright PCB portions 142, 144 and the top portions 186, 188. In some embodiments, the angle of the bend in the PCB portions 108A, 108B may be between 85-degrees and 95-degrees (e.g., between 85 and 95 degrees, 87 and 93 degree, 89 and 91 degrees, values between the foregoing, etc.). One or both of the upright PCB portions 142, 144 and the top PCB portions 186, 188 can include support portions for engaging with features of the radome 104 during assembly and for supporting the radiating elements 110, 112 during use. For example, the upright PCB portions 142, 144 can include upright support portions 143 that extend laterally from the sides of the upright PCB portions 142, 144 and are co-planar to the upright PCB portions 142, 144. The upright support portions 143 can be sections of the PCB portions 108A, 108B that do not include conductive material. The upright support portions 143 can be near the bottom of the upright PCB portions 142, 144 and may not extend to the top edge of the upright PCB portions 142, 144 that is defined by the bend between the upright PCB portions 142, 144 and the top PCB portions 186, 188. Similarly, the top PCB portions 186, 188 can include top support portions 145 that extend laterally from the sides of the top PCB portions 186, 188 and are co-planar to the top PCB portions 186, 188. The top support portions 145 can be sections of the PCB portions 108A, 108B that do not include conductive material.

The conductive material that forms a part of the radiating elements 110, 112 may extend at least along both the upright PCB portions 142, 144 and the top PCB portions 186, 188. For example, the radiating element 110 may include an upright radiating portion 111 formed on the first upright PCB portion 142 and a head radiating portion 187 formed on the first top PCB portion 186, with the bend in the first PCB portion 108A defining the two radiating portions 111, 187 of the radiating element 110. Similarly, the radiating element 112 may include an upright radiating portion 113 formed on the second upright PCB portion 144 and a head radiating portion 189 formed on the second top PCB portion 188, with the bend in the second PCB portion 108B defining the two radiating portions 113, 189 of the radiating element 112. In some embodiments, advantages of a bent of three-dimensional radiating element (e.g., radiating elements 110, 112) can include having two distinct radiating portions, reducing the total height of the multi-element multi-band antenna 102 to be more compact and conserve space, and configuring the radome 104 to be able to easily cover and provide protection for the system in a compact configuration with multi-band coverage. For example, the head radiating portions 187, 189 of the radiating elements 110, 112 can provide further multi-band performance as well as low band performance while maintaining an efficient volume for the multi-element multi-band antenna 102.

In some embodiments, the upright radiating portion 111 of the first radiating element 110 may face the upright radiating portion 113 of the second radiating element 112. For example, the upright radiating portion 111 may face in a first direction and the upright radiating portion 113 may face in a second direction that is substantially opposite the first direction. In some embodiments, the upright radiating portion 111 and the upright radiating portion 113 can be the same height and/or width. In some embodiments, the upright radiating portion 111 and the upright radiating portion 113 can have different heights and/or widths. In some embodiments, the head radiating portion 187 of the first radiating element 110 may be co-planer with the head radiating portion 189 of the second radiating element 112. In some embodiments, the head radiating portion 187 of the first radiating element 110 may be not co-planer with the head radiating portion 189 of the second radiating element 112. In some embodiments, the head radiating portion 187 and the head radiating portion 189 can be the same length and/or width. In some embodiments, the head radiating portion 187 and the head radiating portion 189 can have different length and/or widths. In some embodiments, the radiating elements 110, 112, 114, 115 are spaced close together to reduce the overall volume of the multi-element multi-band antenna 102.

In some implementations, the top PCB portions 186, 188 may engage with features (e.g., slots 192) of the radome 104 to provide support for the PCB portions 108A, 108B as well as to define their shape and placement, as shown and described further with reference to at least FIGS. 6A-6C, 7, and 8. Similarly, the third and fourth PCB portions 108C, 108D of the radiating elements 114, 115 may engage with features (e.g., slots 176) of the radome 104, as described below to provide support for the PCB portions 108C, 108D as well as to define their shape and placement. In some embodiments, the shape of the PCB portions 108 may be obtained during installation of the PCB portions 108 into the radome 104. For example, prior to installation, the PCB portions 108 may be assembled as flat sheets (see e.g., FIG. 6A) and bent to define the upright portions and top portions (see e.g., FIGS. 6B and 6C) when inserted and engaged with the ribbings and slots of the radome 104.

In some embodiments, one or both of the first and second PCB portions 108A, 108B may not include the top portions 186, 188 respectively. For example, one or both of the first and second PCB portions 108A, 108B may be substantially vertical such that they only include the upright PCB portions 142, 144. In this example, the radiating element 112 would not include the head radiating portion 189 and/or the radiating element 110 would not include the head radiating portion 187. Having vertical radiating elements 110, 112 can simplify the assembly of the multi-element multi-band antenna 102 and may be desirable when the size/height of the multi-element multi-band antenna 102 is not an important design consideration. However, including bends in the radiating elements 110, 112 (e.g., having both upright radiating portions 111, 113 and head radiating portions 187, 189)

can provide a benefit of reducing the overall size of the multi-element multi-band antenna 102, which can be desirable. Bending the radiating elements 110, 112 may also define the radiation patterns of the higher order modes.

In some embodiments, one or more of the radiating elements 110, 112, 114, 115 can include one or more apertures. For example, the one or more apertures may extend through the radiating elements 110, 112, 114, 115 (e.g., through both the conductive material and the PCB portions 108. The apertures can be any suitable shape, such as circular, oval, square, rectangular, elliptical, and/or the like. In some embodiments, including radiating elements 110, 112, 114, 115 with apertures can enhance the multi-element multi-band antenna's 102 performance and characteristics for some applications. In one example, apertures can be used to shape the radiation pattern of the multi-element multi-band antenna 102 (e.g., the shape and size of apertures can be used to direct and focus the radiation pattern on the multi-element multi-band antenna 102 in a specific direction, which can increase the gain and/or enhance the multi-element multi-band antenna's 102 directivity). In another example, apertures can be used as resonant structures such that the multi-element multi-band antenna 102 is a frequency-selective antenna (e.g., the size and shape of the apertures can be tuned to resonate at a specific frequency, which would make the multi-element multi-band antenna 102 more responsive at the specific frequency). Other benefits, such as impedance matching and antenna radiation pattern shaping, can also be realized by including apertures in one or more of the radiating elements 110, 112, 114, 115.

With continued reference to FIG. 3, each PCB portion 108 can include a base portion 146. The base portions 146 can be formed from a bend in the bottom of the PCB portions 108 (see e.g., fold lines A-A, B-B in FIG. 6A). The base portions 146 can be used to support the respective PCB portions 108. For example, the base portions 146 can be connected or coupled to the internal ground plane 130. The base portions 146 can be horizontal extension extending from the bottom of the PCB portions 108 in a substantially perpendicular manner. For example, the first PCB portion 108A can include a base portion 146 that extends horizontally from the bottom of the upright PCB portions 142. In the example of the first and second PCB portions 108A, 108B, the base portions 146 can be substantially parallel to the top PCB portions 186, 188. Each base portion 146 can include one or more alignment holes 196 that are configured to receive protrusions 132 of the internal ground plane 130 (see e.g., FIG. 5). The alignment holes 196 and the protrusions 132 can serve as reference points during the manufacturing and assembly of the multi-element multi-band antenna 102. For example, the alignment holes 196 and protrusions 132 facilitate accurate and consistent positioning of the components of the multi-element multi-band antenna 102 during production (e.g., fabrication, assembly, and testing). For example, the alignment holes 196 and the protrusions 132 may facilitate alignment of terminated coaxial cables 122 with microstrip transmission lines to the radiating elements 110, 112, 114, 115 to facilitate consistent electrical performance of the multi-element multi-band antenna 102. For case of illustration, only a portion of the coaxial cables (i.e., the terminated coaxial cables 122) that could be used with the antenna assembly 100 are illustrated. In the assembled antenna assembly 100, the coaxial cables may be fed through a cable opening 119 in the radome 104 to facilitate connection of the multi-element multi-band antenna 102 to the coaxial cables. In some implementations, the antenna assembly 100 may include a cable holder 105 (e.g., a grommet) that can group the coaxial cables together and be positioned within the cable opening 119. The cable holder 105 can also create a seal in the cable opening 119 to reduce the chance of liquid from entering the antenna assembly 100.

As shown in FIG. 3, the antenna assembly 100 can optionally include a GPS antenna 138. The GPS antenna 138 may also be referred to herein as a "GPS radiating device" 138. The GPS antenna 138 can be used to collect signal(s) from geosynchronous satellites so that the GPS function of a radio including the multi-element multi-band antenna 102 can determine where the multi-element multi-band antenna 102 is positioned relative to a global coordinate system. In some embodiments, the GPS antenna 138 may be secured to a base 198 of the internal ground plane 130. In the assembled antenna assembly 100, the GPS antenna 138 may be supported by and/or mechanically bonded a top side of the base 198. For example, an adhesive can be applied to the bottom of the GPS antenna 138. The base 198 can raise the GPS antenna 138 above the internal ground plane 130 so that the terminated coaxial cables 122 are positioned below the radiating portion of the GPS antenna 138. This arrangement can prevent the terminated coaxial cables 122 from disturbing the radiation characteristics of the GPS antenna 138.

Referring now to FIG. 6A, which shows the multi-element multi-band antenna 102 in an initial assembly state, each radiating element 110, 112, 114, 115 can include a feed point 103. The feed points 103 are the locations in the multi-element multi-band antenna 102 where the radio frequency (RF) signal is applied to or extracted from the respective radiating element 110, 112, 114, 115. The feed points 103 can be connected to microstrip transmission lines 116 of the multi-element multi-band antenna 102. In the illustrated embodiment, the transmission lines 116 may be embedded in at least a portion of the PCB portions 108. For example, each PCB portion 108 can include a transmission line 116 that is embedded in the base portions 146 that extends toward the center of the internal ground plane 130. The number of microstrip transmission lines 116 included in the multi-element multi-band antenna 102 may be defined by the number of radiating elements in the multi-element multi-band antenna 102. For example, in the illustrated embodiment, the multi-element multi-band antenna 102 includes four microstrip transmission lines 116, one for each of the radiating elements 110, 112, 114, 115. More or less transition lines are also possible, where the multi-element multi-band antenna 102 includes a different number radiating elements. The transmission lines 116 facilitate an electrical connection between the terminated coaxial cables 122, and the feed points 103 of the radiating elements 110, 112, 114, 115 to electrically excite the radiating elements 110, 112, 114, 115.

The geometry of the feed points 103 can impact the performance (e.g., impedance matching, radiation pattern, polarization, gain and directivity, bandwidth, and/or the like) of the radiating elements 110, 112, 114, 115. As such, the geometry of the feed points 103 may vary between the radiating elements 110, 112, 114, 115, depending on the desired performance. The feed points 103 can be tapered or "V" shaped portions at the bottom of the radiating elements 110, 112, 114, 115 respectively. The angle of the V-shaped portions relative to the horizontal (e.g., defined by the internal ground plane 130) and/or the starting point of the V-shaped portions (e.g., relative to the vertical) can be selected to obtain impedance matching over a broad frequency range between the radiating elements 110, 112, 114, 115 and the microstrip transmission lines 116. In some embodiments, the starting point and angle of the V-shaped portions can differ between the radiating elements 110, 112, 114, 115. In some embodiments, the starting point and angle of the V-shaped portions can be the same for one of more of the radiating elements 110, 112, 114, 115. In some embodiments, where the radiating elements 110, 112, 114, 115 include one or more apertures, as described herein, an aperture can be placed slightly above the V-shaped portions, which can help with impedance matching. In other implementations, other feeding systems are possible.

Figure 5:
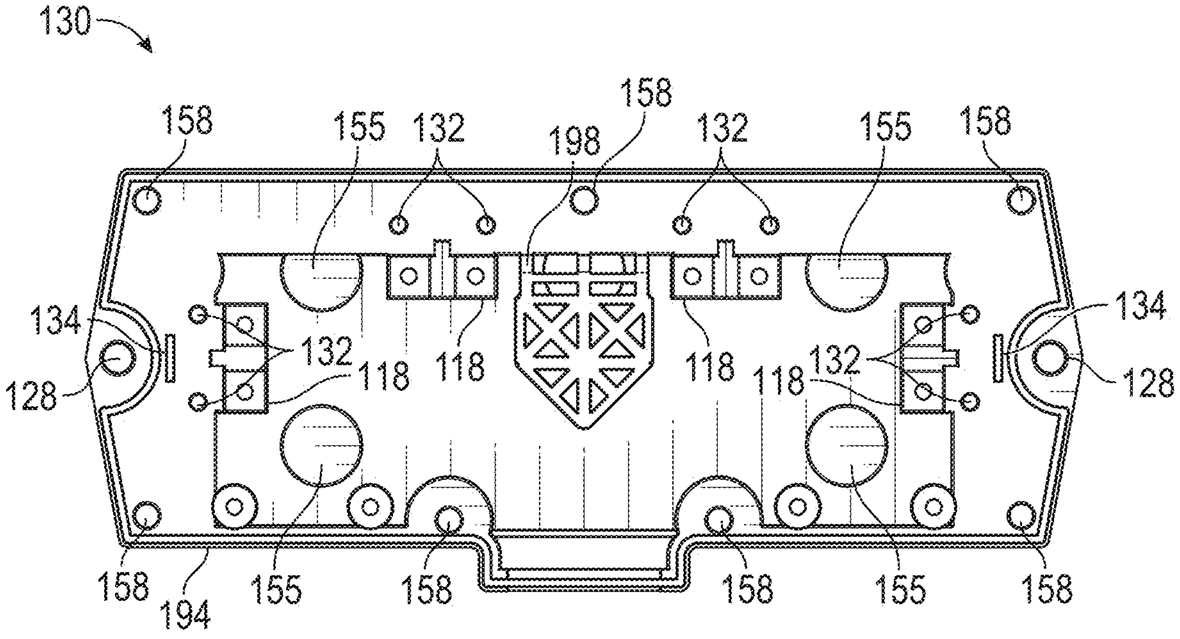
FIG. 5 illustrates a top view of an internal ground plane of the antenna assembly of FIG. 1.

Turning now to FIG. 5, which illustrates a top view of the internal ground plane 130, that can act as the base of the internal ground plane 130. The internal ground plane 130 can made of a conductive material, such as die cast aluminum. In some cases, the internal ground plane 130 may be a solderable sheet metal material such as brass, copper, tin plated steel, and/or the like. The internal ground plane 130 can include a plurality of cable holders 118. The cable holder 118 can be configured to hold the terminated coaxial cables 122 in a fixed position when used in combination with cable brackets 124 (see e.g., FIG. 3). For example, when assembling the antenna assembly 100, the outer conductors of the terminated coaxial cables 122 can be positioned on the cable holders 118 and fixed to the internal ground plane 130 using the cable brackets 124 and one or more fasteners. This mechanical clamp solution can establish a connection between the outer conductors of the coaxial cables and the internal ground plane 130 of the antenna assembly 100. In the assembled position, between the cable holders 118 and the cable brackets 124, the terminated coaxial cables 122 can be aligned with the transmission lines 116 of the radiating elements 110, 112, 114, 115, allowing the inner connectors of the coaxial cables to be electrically coupled to the radiating elements 110, 112, 114, 115. In this arrangement, the microstrip transmission lines 116 allow the radio frequency ("RF") signals to propagate from the attachment point of the terminated coaxial cables 122 to the feeding points 103 of the radiating elements 110, 112, 114, 115.

The internal ground plane 130 can be the base of the antenna assembly 100. In some implementations, the antenna assembly 100 can include an additional base component, and the internal ground plane 130 can be secured to the additional base component. The internal ground plane 130 can include a plurality of fastener holes 158 that extend through the internal ground plane 130. The fastener holes 158 can be aligned with fastener holes 156 of the radome 104 (see e.g., FIG. 4) and fasters 150 (see e.g., FIG. 3) can be used to securely couple the internal ground plane 130 to the radome 104. In other implementations, different fastening means can be used to couple the radome 104 to the internal ground plane 130. In some implementations, the internal ground plane 130 can include one or more stiffener slots 134. The stiffener slots 134 can be positioned outwardly from the protrusions 132 and can be configured to receive stiffeners (e.g., stiffeners 120) to assist in the stability of one or more of the radiating elements 110, 112, 114, 115.

Figure 2:
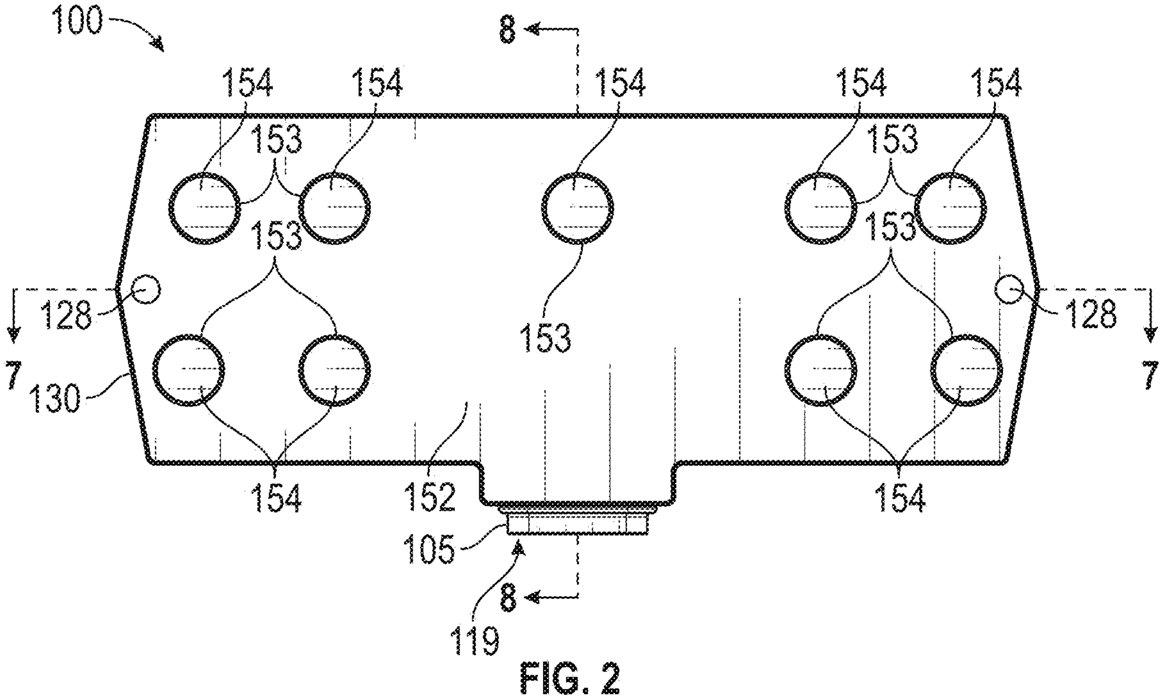
FIG. 2 illustrates a bottom view of the antenna assembly of FIG. 1.

The internal ground plane 130 can optionally include one or more magnet holders 155. The one or more magnet holders 155 can extend upwardly from the bottom of the internal ground plane 130 and may be configured to receive magnets 154 of the antenna assembly 100. For example, FIG. 2 shows a bottom view of the antenna assembly 100, with the magnets 154 positioned in the magnet holders 155. The magnets 154 may be positioned the internal ground plane 130 to allow the antenna assembly 100 to be magnetically coupled to a client ground plane or other magnetic surface. In other embodiments, threaded fasteners or other suitable mechanical means can be used instead of or in addition to the magnets 154 to create the mechanical coupling between the antenna assembly 100 and the client ground plane or other location where the antenna assembly 100 is to be deployed. For example, as shown in at least FIGS. 4 and 5, the radome 104 can optionally include one or more external fastener holes 126 and the internal ground plane 130 can include one or more corresponding external fastener holes 128 that can be aligned in the assembled antenna assembly 100. The external fasteners holes 126, 128 can be used with external fasteners to couple the antenna assembly 100 to a deployment location.

With continue reference to FIG. 2, the antenna assembly 100 can include a gasket 152. The gasket 152 may be a non-conductive or electrically-conductive weather gasket, for example. The gasket 152 may be secured to the bottom side of the internal ground plane 130. In this arrangement, the gasket 152 can be positioned between the internal ground plane 130 and a deployment surface, such as the client ground plane. The gasket 152 may also provide a non-slip surface between the antenna assembly 100 and the location where the antenna assembly 100 is deployed. The gasket 152 can be fixed to the internal ground plane 130 using any conventional means (e.g., adhesive). In some embodiments, the gasket 152 can help prevent fluid from entering the antenna assembly 100 and damaging the multi-element multi-band antenna 102. In some instances, the gasket 152 is an anti-skid gasket to assist the stability of the placement of the antenna assembly 100. In some embodiments, the gasket 152 may include a plurality of openings 153. The openings 153 may be positioned on the gasket 152 so that the openings 153 align with the plurality of magnets 154. The openings 153 may increase a strength of magnetic coupling between the magnets 154 and the deployment location.

Figure 4:
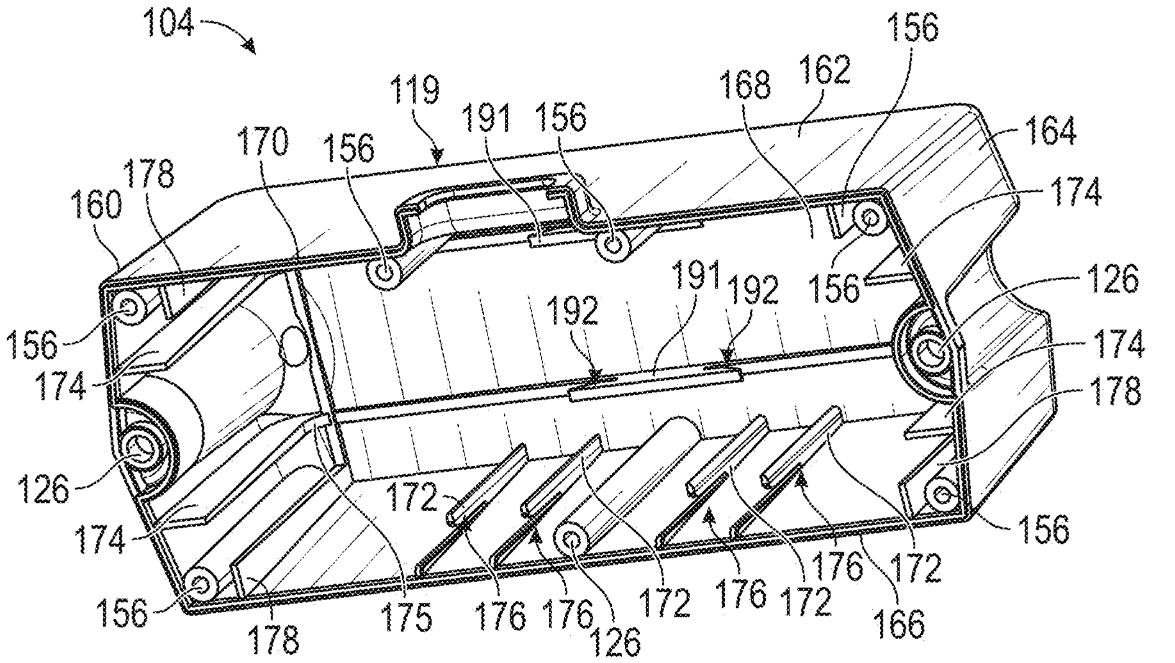
FIG. 4 illustrates a perspective internal view of the non-conductive cover of the antenna assembly of FIG. 1.

Turning now to FIG. 4, an internal perspective view of the radome 104 is shown. The radome 104 may provide mechanical support for the multi-element multi-band antenna 102. The radome 104 may be transparent to radiation from the multi-element multi-band antenna 102 and may serve as an environmental shield for the internal components of the multi-element multi-band antenna 102. The radome 104 may be made of a non-conductive material.

In some implementations, the radome 104 may be generally rectangular prism shaped, with an open bottom. In other implementations, other shapes are possible for the radome 104. The radome 104 can include four side walls, 160, 162, 164, and 166 and a top wall 168. The top wall 168 is fixed to the four side walls 160, 162, 164, and 166, which also define a periphery or bottom edge 170 of the radome 104. The side walls 160, 162, 164, and 166 may be substantially perpendicular to the internal ground plane 130 and/or the top wall 168 in the assembled antenna assembly 100. In some embodiments, one or more of the side walls 160, 162, 164, and 166 may have a taper when extending from the bottom edge 170 to the top wall 168. For example, the side walls 160, 162, 164, and 166 may be at an angle less than 90-degrees relative to a plane defined by the internal ground plane 130. In the assembled configuration, the bottom edge 170 of the radome 104 may extend into a base slot 194 of the internal ground plane 130 (see e.g., FIG. 5).

When assembling the antenna assembly 100, the radome 104 can be positioned on the internal ground plane 130 (see e.g., FIG. 1) to secure the internal components of the multi-element multi-band antenna 102. The radome 104 may include a plurality of fastener holes 156 on the bottom portion of the radome 104. In some embodiments, one or more the plurality of fastener holes 156 may be positioned at each corner of the radome 104 and/or along one or more of the sidewalls 160, 162, 164, 166 of the radome 104. The plurality of fastener holes 156 may extend up the side walls 160, 162, 164, and 166 of the radome 104. In some embodiments, the fastener holes 156 may be tapered. In some embodiments, the fastener holes 156 may be threaded. In some embodiments, the fasteners 150 can be thread forming screws such that the fastener holes 156 may not be tapped prior to installation. These plurality of fastener holes 156 may be aligned with fastener holes 158 of the internal ground plane 130 in the assembled antenna assembly 100 and fasteners 150 (see e.g., FIG. 3) can be positioned within the holes 156, 158 to secure the radome 104 and the internal components of the multi-element multi-band antenna 102 to the internal ground plane 130.

In accordance with some embodiments, the radome 104 may include one or more features that can be used to support the radiating elements 110, 112, 114, 115 via the PCB portions 108 and to define the shape of the radiating elements 110, 112, 114, 115. For example, as shown in FIG. 4, the radome 104 can include on or more first ribs 172, one or more second ribs 174, one or more wall guides 178, and/or one or more top supports 191. The interior ribs and slot features (e.g., the first ribs 172, second ribs 174, slots 176, and top supports 191) of the radome 104 hold the radiating elements 110, 112, 114, 115 in place for proper mechanical alignment during the fabrication of the multi-element multi-band antenna 102 such that the radiating elements 110, 112, 114, 115 are held in their desired positions so that the multi-element multi-band antenna 102 meets it desired electrical performance for return loss and radiation patterns over the desired frequency band.

The first ribs 172 can be used to support the radiating elements 114, 115 in the upright configuration. The first ribs 172 may be projections or catch points extending from the interior sides of the walls of the radome 104. For example, the first ribs 172 can extend inwardly from the side wall 166 towards the center of the interior the radome 104. The first ribs 172 may extend from the bottom edge 170 to the top wall 168. The first ribs 172 may include a bottom tapered portion that is at an angle relative to vertical axis and an upper portion that is generally aligned with the vertical axis. In the embodiment illustrated in FIG. 4, the side wall 166 includes two pairs of first ribs 172, one pair for the radiating element 114 and one pair for the radiating element 115. The radome 104 may include more or less first ribs 172, depending on the number of WiFi radiating elements includes in the multi-element multi-band antenna 102. Each first rib 172 can include a slot 176. The slots 176 may be generally V-shaped. The outer edge of the slot 176 may extend downwardly to a point before the first rib 172 extends vertically to the top wall 168. The radiating elements 114, 115 can be received in the slots 176 in the assembled antenna assembly 100. For example, FIG. 8 shows a section view of the antenna assembly 100 taken along the line 8-8 in FIG. 2, with the radiating elements 115 positioned in the slots 176 of the first ribs 172. In the assembled configuration, the radiating elements 114, 115 are received and supported by the first ribs 172 via the slots 174. In FIG. 8, the GPS antenna 138 is not shown for illustrative purposes.

In some embodiments, the antenna assembly 100 may include one or more stiffeners 120 (see e.g., FIG. 3), that may be located between each pair of first ribs 172. The stiffeners 120 may be configured to provide structural support to the radiating elements 114, 115 and may be positioned between the PCB portions 108C, 108D and the side wall 166 of the radome 104. The stiffeners 120 can help the PCB portions 108C, 108D remain planer when installed in the radome 104 and, desirably throughout the life of the multi-element multi-band antenna 102. The stiffeners 120 may be made of any suitable material, such as plastic, FR4, other non-conductive material, and/or the like. Generally, the stiffeners 120 are made of a non-conductive material. In some embodiments, the stiffeners 120 may be mechanically coupled to the back sides of the PCB portions 108C, 108D using any conventional means.

The second ribs 174 and the wall guides 178 can be used to support the radiating elements 110, 112 in addition to assisting in the formation of the shape of the radiating elements 110, 112, as described further with reference to FIGS. 6A-6C. The second ribs 174 can be projections that extend from the interior sides of the walls of the radome 104. For example, a pair of second ribs 174 can extend inwardly from the side wall 160 towards the center of the interior the radome 104 and another pair of second ribs 174 can extend inwardly from the side wall 164 towards the center of the interior the radome 104. The second ribs 174 can include a curved top portion 175 that extends from the second rib 174 towards and along the interior of the top wall 168. The curved top portions 175 can be used to cause the radiating elements 110, 112 to assume their three dimensional shape during assembly. The wall guides 178 can be projections extending from the interior sides of the walls of the radome 104. The wall guides 178 can be substantially perpendicular to the second ribs 174. For example, the wall guides 178 can extend inwardly from the side walls 162, 166 towards the center of the interior of the radome 104. One wall guide 178 can be positioned near each second rib 174. Moving inwardly from the side wall 160 or the side wall 164, a gap exists between the second ribs 174 and the wall guides 178. In the assembled antenna assembly 100, a portion of the radiating elements 110, 112 can be positioned within this gap. For example, as shown in FIG. 7, the radiating elements 110, 112 are positioned between the gaps between the second ribs 174 and the wall guides 178. As explained further with reference to FIGS. 6A-6C, the wall guides 178 can be used as a catch feature for mechanical stability for the radiating elements 110, 112, along with the stiffeners 120. For example, the stiffeners 120 can be positioned between each pair of second ribs 174 to provide structural support to the upright radiating portions 111, 113 of radiating elements 110, 112. Additional stiffeners 120 may be configured to support the head radiating portions 187, 189. For example, stiffeners 120 may be positioned between the upright PCB portions 142, 144 and the side wall 160, 164 of the radome 104 respectively and additional stiffeners 120 may be positioned between the top portion PCB portions 186, 188 and the top wall 168. The stiffeners 120 can help the PCB portions 108A, 108B remain planer when installed in the radome 104 and, desirably throughout the life of the multi-element multi-band antenna 102.

The top supports 191 are configured to provide support for the head radiating portions 187, 189 of the radiating elements 110, 112. The top supports 191 can include slots 192 for receiving the top portion PCB portions 186, 188. For example, the edges of the top PCB portions 186, 188 may extend into the slots 192 to provide support for the radiating elements 110, 112 and to maintain the desired configuration of the radiating elements 110, 112. The top supports 191 can extend vertically from the interior of the top wall 168 towards the internal ground plane 130. The top supports 191 may be generally L-shaped projections. Each top support 191 can include two slots 192 that face the side walls 160, 164. This arrangement is shown more clearly in FIGS. 7 and 8. In some embodiments, the radome 104 may include two top supports 191, which may include two slots 192 for the first PCB portion 108A and two slots 192 for the second PCB portion 108B.

FIGS. 6A-6C show the antenna assembly 100 without the radome 104 in various states of assembly. FIG. 6A shows the antenna assembly 100 with the radiating elements 110, 112, 114, 115 in a first/pre-assembly configuration, FIG. 6B shows the antenna assembly 100 with the radiating elements 110, 112, 114, 115 in in a second/partial-assembly configuration, and FIG. 6C shows the antenna assembly 100 with the radiating elements 110, 112, 114, 115 in a third/final-assembly configuration. As noted above, in some embodiments, the interior portion of the radome 104 (e.g., the ribs 172, 174, wall guides 178, and top supports 191) are configured as catch points for the PCB portions 108 and can be used to shape the radiating elements 110, 112, 114, 115. For example, the interior portions of the radome 104 can hold the radiating elements 110, 112, 114, 115 in place for proper mechanical alignment during the fabrication of the antenna. Proper mechanical alignment can ensure that the radiating elements 110, 112, 114, 115 are held in their proper place so that the multi-element multi-band antenna 102 meets its desired electrical performance for return loss, radiation patterns, and other electrical characteristics over the desired frequency bands. The curved and three-dimensional characteristics of the PCB portions 108 can be obtained during the installation of the PCB portions 108 into the radome 104 due to the interior portion of the radome 104 (e.g., the ribs 172, 174, wall guides 178, and top supports 191) being configured such that the PCB portions 108 are bent during the assembly portion of the manufacturing upon insertion into the radome 104. In some implementations, the curved and three-dimensional characteristics of the PCB portions 108 can be obtained during the installation of the PCB portions 108 into the radome 104 without any manual bending or pre-bending of the PCB portions 108.

Turning to FIG. 6A, in a pre-assembly configuration, the PCB portions 108 may be in flat with no bends. The PCB portions 108 can be coupled to the internal ground plane 130 by aligning the alignment holes 196 in the base portions 146 with the appropriate protrusions 132 of the internal ground plane 130. In some implementations, the bottom side of the base portions 146 may include an adhesive such that the base portions 146 can be coupled to the internal ground plane 130. In this arrangement, the PCB portions 108 may be co-planar to each other and aligned with cable holders 118. While FIG. 6A shows the terminated coaxial cables 122, it is recognized that the coaxial cables may be connected at a different time in the assembly process.

Once the PCB portions 108 are coupled to the internal ground plane 130 via the base portions 146, one or more of the PCB portions 108 can be bent into a final assembly state by inserting the PCB portions 108 into the radome 104. For example, when the radome 104 is inserted onto the internal ground plane 130, the first and second PCB portions 108A, 108B can be guided through the gap between the second ribs 174 and the wall guides 178 (e.g., by a user holding the first and second PCB portions 108A, 108B). In some implementations, the wall guides 178 can be tapered so that the bottom of the wall guides 178 extend further into the interior of the radome 104 that the top. This design ensures that the top PCB portions 186, 188 remain within the gap on initial insertion of the radome 104 because of potential contact between the top support portions 145 and the wall guides 178, and that the top PCB portions 186, 188 can extend past the gap into the interior of the radome 104 on further insertion of the radome 104. For example, as the top edge of the first and second PCB portion 108A, 108B contacts the curved top portion 175 of the second ribs 174, the first and second PCB portion 108A, 108B are pushed inwardly from the side walls 160, 164 respectively and towards the top supports 191. Continued insertion of the radome 104 causes the upright support portions 143 to extend into the gap between the second ribs 174 and the wall guides 178. With the first and second PCB portions partially contained within the radome 104, the third and fourth PCB portions 108C, 108D can be inserted into the slots 176 of the first ribs 172 (e.g., by a user holding the third and fourth PCB portions 108C, 108D). Insertion of the third and fourth PCB portions 108C, 108D into the slots 176 can cause the third and fourth PCB portions 108C, 108D to bend along the fold lines B-B). The first and second PCB portion 108A, 108B can assume their final "L" shaped form on final insertion of the bottom edge 170 of the radome 104 into the base slot 194, as shown in FIG. 6C (e.g., with both the first and second PCB portion 108A, 108B being bent along the fold lines A-A and C-C due to engagement with the radome 104). The final insertion causes the top PCB portions 186, 188 to enter the slots 192 of the top supports 191 (see e.g., FIGS. 7 and 8) and the first and second PCB portion 108A, 108B to bend along the bend lines C-C, defining the upright radiating portions 111, 113 and the head radiating portion 187, 189 of the radiating elements 110, 112 respectively. The radome 104 can then be fixed to the internal ground plane 130 by threading fasteners 150 through the fastener holes 156 in the internal ground plane 130 and into the fastener holes 158 in the radome 104.

In some implementations, the one or more of the PCB portions 108 can be manually folded along the fold lines as part of the assembly process. For example, once the PCB portions 108 are coupled to the internal ground plane 130 via the base portions 146, one or more of the PCB portions 108 can be bent into a partial or final assembly state. As noted herein, the PCB portion 108 can optionally comprises a Flex PCB substrate. As shown in FIG. 6B, the first PCB portion 108A and the second PCB portion 108B can be folded in a direction away from the internal ground plane 130 along the fold lines A-A. Folding the PCB portions 108A, 108B in this manner creates an approximately 90-degree angle between the base portions 146 and the upright PCB portions 142, 144. Optionally, stiffeners 120 can be inserted into the stiffener slots 134 behind the first PCB portion 108A and the second PCB portion 108B. In some cases, inserting the stiffeners 120 into the stiffener slots 134 can cause the PCB portions 108A, 108B to bend approximately along the fold lines A-A. While the flex-circuit design of the radiating elements 110, 112, 114, 115 may not require fold lines that are intended to bend, in some implementations, the fold lines (e.g., fold lines A-A, B-B, C-C, etc.) can be areas of the radiating elements 110, 112, 114, 115 that are intentionally designed to bend, and the fold lines can guide and control the bending process. For example, the fold lines can be areas of the radiating elements 110, 112, 114, 115 that comprise thinner or perforated substrate to facilitate bending without damaging the conductive traces. Other methods of enabling the PCB portions 108 to bend along a desired plane can also be implemented. Bendable fold lines may provide a particular benefit when the radiating elements 110, 112, 114, 115 comprise sheet metal or another rigid material.

Optionally, when the PCB portions 108 are in the partially assembled state and coupled to the internal ground plane 130, the coaxial cables can be electrically connected to the antenna assembly 100. For example, the coaxial cables can be slid through the cable holder 105 and the terminated coaxial cables 122 can be positioned in the cable holders 118 such that the outer conductors are in contact with the internal ground plane 130 via the cable holders 118 and the inner conductors are positioned over the microstrip transmission lines 116. The cable brackets 124 can then be secured to the cable holders 118 (e.g., using one or more fasteners) with the terminated coax in between. The center conductors of the coaxial cables can then be soldered to the microstrip transmission lines 116 on the PCB portions 108, which results in the coaxial cables being electrically coupled to the radiating elements 110, 112, 114, 115. By coupling the coaxial cables in this manner, the center conductors are positioned at or near the feed points 103 of the radiating elements 110, 112, 114, 115, which minimizes the required length of the microstrip transmission lines 116 (i.e., a distance between the terminated coaxial cables 122 and the radiating elements 110, 112, 114, 115).

To complete the assembly of the multi-element multi-band antenna 102, the third and fourth PCB portions 108C, 108D can be folded in a direction away from the internal ground plane 130 along the fold lines B-B. Folding the PCB portions 108C, 108D in this manner creates an approximately 90-degree angle between the base portions 146 and remainder of the PCB portions 108C, 108D. Optionally, additional stiffeners can be added to any of the PCB portions 108, such as on the back sides of the PCB portions 108C, 108D and on the top PCB portions 186, 188. The radome 104 can then be positioned on the top side of the internal ground plane 130, causing the first and second PCB portion 108A, 108B to assume their final three-dimensional form, as shown in FIG. 6C.

When the radome 104 is inserted onto the internal ground plane 130, the first and second PCB portions 108A, 108B can be guided through the gap between the second ribs 174 and the wall guides 178. In some implementations, the wall guides 178 can tapered so that the bottom of the wall guides 178 extend further into the interior of the radome 104 that the top. This design ensures that the top PCB portions 186, 188 remain within the gap on initial insertion of the radome 104 because of potential contact between the top support portions 145 and the wall guides 178, and that the top PCB portions 186, 188 can extend past the gap into the interior of the radome 104 on further insertion of the radome 104. For example, as the top edge of the first and second PCB portion 108A, 108B contacts the curved top portion 175 of the second ribs 174, the first and second PCB portion 108A, 108B are pushed inwardly from the side walls 160, 164 respectively and towards the top supports 191. Continued insertion of the radome 104 causes the upright support portions 143 to extend into the gap between the second ribs 174 and the wall guides 178 and the third and fourth PCB portions 108C, 108D to extend into the slots 176 of the first ribs 172. The first and second PCB portion 108A, 108B can assume their final "L" shaped form on final insertion of the bottom edge 170 of the radome 104 into the base slot 194, as shown in FIG. 6C. The final insertion causes the top PCB portions 186, 188 to enter the slots 192 of the top supports 191 (see e.g., FIGS. 7 and 8) and the first and second PCB portion 108A, 108B to bend along the bend lines C-C, defining the upright radiating portions 111, 113 and the head radiating portion 187, 189 of the radiating elements 110, 112 respectively. The radome 104 can then be fixed to the internal ground plane 130 by threading fasteners 150 through the fastener holes 156 in the internal ground plane 130 and into the fastener holes 158 in the radome 104.

The three-dimensional forming of the radiating elements 110, 112, 114, 115 by the radome 104 during the assembly process advantageously reduces manufacturing time and expense and provides for properly shaped and positioned radiating elements 110, 112, 114, 115. For example, the radome 104 is used to form the radiating elements 110, 112 into a desired "C" shape, "L" shape, or another suitable and desired three-dimensional shape.

In some embodiments, the antenna assembly 100 may include one or more additional substrate components for support of the PCB portions 108 (e.g., PCB supports). These PCB support(s) may be positioned between the PCB portions 108 and the internal ground plane 130 to provide additional spacing (e.g., a gap) between the transmission lines 116 (formed on the base portions 146) and the internal ground plane 130. This arrangement may provide certain benefits when the non-conductive PCB portions 108 are not of sufficient thickness to provide adequate spacing for the desired performance of the microstrip transmission lines 116. The PCB supports can be FR4, plastic, foam, and/or the like. In some embodiments, the PCB support may be a single continuous piece that covers at least a portion of the internal ground plane 130. In other embodiments, the PCB support may be a plurality of smaller support portions positioned between each of the PCB portions 108 and the internal ground plane 130.

In an assembled configuration, the antenna assembly 100 may include the gasket 152 secured to the bottom side of the internal ground plane 130 with the magnets 154 positioned within the internal ground plane 130. The coaxial cables for the radiating elements 110, 112, 114, and 115 and the GPS antenna 138 cable may be coupled to the top side of the internal ground plane 130. The radiating elements 110, 112, 114, 115 may be positioned within the radome 104, with the radome 104 allowing the radiating elements 110, 112, 114, 115 to assume the three-dimensional shape illustrated in at least FIG. 6C during the installation process. The assembled radome 104 may be positioned on the internal ground plane 130, with the bottom edge 170 of the radome 104 extending into the base slot 194 of the internal ground plane 130 and the fastener holes 156 of the radome 104 aligned with the fastener holes 158 of the internal ground plane 130. Finally, the radome 104 can be fixed to the internal ground plane 130 via the fasteners 150.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

EXAMPLE CLAUSES

Various examples of systems relating to an antenna system are found in the following clauses:

Clause 1. An antenna assembly comprising: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a plurality of radiating elements comprising: a first cellular radiating element formed on a first PCB portion, the first cellular radiating element comprising a first upright radiating portion and a first head radiating portion; a second cellular radiating element formed on a second PCB portion, the second cellular radiating element comprising a second upright radiating portion and a second head radiating portion; and a WiFi radiating element formed on a third PCB portion; wherein the first cellular radiating element and the second cellular radiating element are configured to move from a first configuration prior to engagement with the cover to a second configuration when the cover is coupled to the internal ground plane, wherein in the first configuration the first upright radiating portion is coplanar to the first head radiating portion and the second upright radiating portion is coplanar to the second head radiating portion, wherein in the second configuration, the first upright radiating portion is at an angle relative to the first head radiating portion and the second upright radiating portion is at an angle relative to the second head radiating portion.

Clause 2. The antenna assembly of Clause 1, wherein the first PCB portion, the second PCB portion, and the third PCB portion comprise flex circuits.

Clause 3. The antenna assembly of Clause 1 or Clause 2, wherein the cover comprises a plurality of ribs formed on internal surfaces of the one or more side walls, the plurality of ribs configured to engage the plurality of radiating elements.

Clause 4. The antenna assembly of Clause 3, wherein the plurality of ribs are configured as catch points for the plurality of radiating elements, wherein engagement between one or more of the plurality of ribs and the first cellular radiating element and the second cellular radiating element causes the first cellular radiating element and the second cellular radiating element to move from the first configuration to the second configuration.

Clause 5. The antenna assembly of Clause 3 or Clause 4, wherein the plurality of ribs support the plurality of radiating elements in a desired orientation relative to the internal ground plane.

Clause 6. The antenna assembly of any of Clauses 3-5, wherein at least one of the plurality of ribs comprises a slot, the slot configured to receive and support the WiFi radiating element.

Clause 7. The antenna assembly of any of Clauses 1-6, wherein the plurality of radiating elements extend from the internal ground plane at a substantially orthogonal angle relative to the internal ground plane.

Clause 8. The antenna assembly of any of Clauses 1-7, wherein the first head radiating portion is substantially coplanar to the second head radiating portion.

Clause 9. The antenna assembly of any of Clauses 1-8, wherein the first PCB portion, the second PCB portion, and the third PCB portion are coupled to the internal ground plane.

Clause 10. The antenna assembly of any of Clauses 1-9, further comprising a plurality of magnets, the plurality of magnets housed in the internal ground plane and configured to allow the antenna assembly to be magnetically coupled to an external surface.

Clause 11. The antenna assembly of any of Clauses 1-10, further comprising a GPS antenna, the GPS antenna coupled to the internal ground plane and positioned between the internal ground plane and the cover.

Clause 12. The antenna assembly of any of Clauses 1-11, wherein the first cellular radiating element and the second cellular radiating element are configured for communication between approximately 450 MHz and 8 GHz and the WiFi radiating element is configured for communication between approximately 1 GHz and 8 GHz.

Clause 13. The antenna assembly of any of Clauses 1-12, wherein the first upright radiating portion is substantially orthogonal to the first head radiating portion and the second upright radiating portion is substantially orthogonal to the second head radiating portion.

Clause 14. The antenna assembly of any of Clauses 1-13, wherein the cover comprises one or more support portions extending inwardly from the top wall towards the internal ground plane, the one or more support portions comprising slots configured to receive and support the first head radiating portion and the second head radiating portion.

Clause 15. The antenna assembly of any of Clauses 1-14, wherein the cover and the internal ground plane when coupled define an internal compact volume of less than 30 cubic inches.

Clause 16. The antenna assembly of any of Clauses 1-15, wherein the internal ground plane comprises a plurality of cable clamps configured to mechanically and electrically couple outer conductors of coaxial cables to the internal ground plane.

Clause 17. A method of assembling an antenna assembly, the method comprising: coupling one or more radiating elements in a first configuration to an internal ground plane; and positioning a cover on the internal ground plane, with the one or more radiating elements positioned between the cover and the internal ground plane, wherein positioning the cover on the internal ground plane causes at least a first radiating element of the one or more radiating elements to move to a second configuration, wherein in the first configuration, the first radiating element is substantially flat, wherein in the second configuration, the first radiating element has a three-dimensional shape.

Clause 18. The method of Clause 17, wherein the one or more radiating elements comprise one or more PCB portions, the one or more PCB portions comprising flex circuits.

Clause 19. The method of Clause 17 or Clause 18, wherein the cover comprises a plurality of ribs formed on internal surfaces of one or more side walls of the cover, the plurality of ribs configured to engage the one or more radiating elements.

Clause 20. The method of Clause 19, wherein the plurality of ribs are configured as catch points for the one or more radiating elements, wherein engagement between one or more of the plurality of ribs and the first radiating element causes the first radiating element to move from the first configuration to the second configuration during assembly of the antenna assembly.

Clause 21. The method of Clause 19 or Clause 20, wherein the plurality of ribs support the one or more radiating elements in a desired orientation relative to the internal ground plane.

Clause 22. The method of any of Clauses 19-21, wherein the one or more radiating elements further comprise a second radiating element and a third radiating element.

Clause 23. The method of any of Clauses 22, wherein at least one of the plurality of ribs comprises a slot, the slot configured to receive and support the third radiating element.

Clause 24. The method of any of Clauses 17-23, wherein the one or more radiating elements extend from the internal ground plane at a substantially orthogonal angle relative to the internal ground plane.

Clause 25. The method of any of Clauses 22-24, wherein the first radiating element comprising a first upright radiating portion and a first head radiating portion, wherein the second radiating element comprising a second upright radiating portion and a second head radiating portion.

Clause 26. The method of Clause 25, wherein the first head radiating portion is substantially coplanar to the second head radiating portion.

Clause 27. The method of any of Clauses 22-26, wherein the first radiating element and the second radiating element are configured for communication between approximately 450 MHz and 8 GHz and the third radiating element is configured for communication between approximately 1 GHz and 8 GHz.

Clause 28. The method of any of Clauses 25-27, wherein the first upright radiating portion is substantially orthogonal to the first head radiating portion and the second upright radiating portion is substantially orthogonal to the second head radiating portion.

Clause 29. The method of any of Clauses 17-28, wherein the antenna assembly further comprises a plurality of magnets, the plurality of magnets housed in the internal ground plane and configured to allow the antenna assembly to be magnetically coupled to an external surface.

Clause 30. The method of any of Clauses 17-29, further comprising: inserting a GPS antenna into the antenna assembly, the GPS antenna coupled to the internal ground plane and positioned between the cover and the internal ground plane.

Clause 31. The method of any of Clauses 25-30, wherein the cover comprises one or more support portions extending inwardly from a top wall of the cover towards the internal ground plane, the one or more support portions comprising slots configured to receive and support the first head radiating portion and the second head radiating portion.

Clause 32. The method of any of Clauses 17-31, wherein the cover and the internal ground plane when coupled define an internal compact volume of less than 30 cubic inches.

Clause 33. The method of any of Clauses 17-32, wherein the internal ground plane comprises a plurality of cable clamps configured to mechanically and electrically couple outer conductors of coaxial cables to the internal ground plane.

Clause 34. An antenna assembly comprising: a cover comprising one or more side walls and a top wall; an internal ground plane, the internal ground plane comprising a base of the antenna assembly and configured to couple to the cover; and a multi-band antenna positioned between the cover and the internal ground plane, the multi-band antenna comprising a one or more radiating elements comprising: a first radiating element formed on a first PCB portion, the first radiating element comprising a first upright radiating portion and a first head radiating portion; wherein the first radiating element is configured to move from a first configuration prior to engagement with the cover to a second configuration when the cover is coupled to the internal ground plane, wherein in the first configuration the first upright radiating portion is coplanar to the first head radiating portion, wherein in the second configuration, the first upright radiating portion is at an angle relative to the first head radiating portion.

Clause 35. The antenna assembly of Clause 34, wherein the first PCB portion comprises a flex circuit.

Clause 36. The antenna assembly of Clause 34 or Clause 35, wherein the cover comprises a plurality of ribs formed on internal surfaces of the one or more side walls, the plurality of ribs configured to engage the one or more radiating elements.

Clause 37. The antenna assembly of Clause 36, wherein the plurality of ribs are configured as catch points for the one or more radiating elements, wherein engagement between one or more of the plurality of ribs and the first radiating element causes the first radiating element to move from the first configuration to the second configuration.

Clause 38. The antenna assembly of Clause 36 or Clause 37, wherein the plurality of ribs support the one or more radiating elements in a desired orientation relative to the internal ground plane.

Clause 39. The antenna assembly of any of Clauses 34-38, wherein the one or more radiating elements further comprise a second radiating element formed on a second PCB portion and a third radiating element formed on a third PCB portion, the second radiating element comprising a second upright radiating portion and a second head radiating portion.

Clause 40. The antenna assembly of Clause 39, wherein at least one of the plurality of ribs comprises a slot, the slot configured to receive and support the third radiating element.

Clause 41. The antenna assembly of any of Clauses 34-40, wherein the one or more radiating elements extend from the internal ground plane at a substantially orthogonal angle relative to the internal ground plane.

Clause 42. The antenna assembly of any of Clauses 39-41, wherein the first head radiating portion is substantially coplanar to the second head radiating portion.

Clause 43. The antenna assembly of any of Clauses 39-42, wherein the first PCB portion, the second PCB portion, and the third PCB portion are coupled to the internal ground plane.

Clause 44. The antenna assembly of any of Clauses 34-43, further comprising a plurality of magnets, the plurality of magnets housed in the internal ground plane and configured to allow the antenna assembly to be magnetically coupled to an external surface.

Clause 45. The antenna assembly of any of Clauses 34-44, further comprising a GPS antenna, the GPS antenna coupled to the internal ground plane and positioned between the internal ground plane and the cover.

Clause 46. The antenna assembly of any of Clauses 39-45, wherein the first radiating element and the second radiating element are configured for communication between approximately 450 MHz and 8 GHz and the radiating element is configured for communication between approximately 1 GHz and 8 GHz.

Clause 47. The antenna assembly of any of Clauses 39-46, wherein the first upright radiating portion is substantially orthogonal to the first head radiating portion and the second upright radiating portion is substantially orthogonal to the second head radiating portion.

Clause 48. The antenna assembly of any of Clauses 39-47, wherein the cover comprises one or more support portions extending inwardly from the top wall towards the internal ground plane, the one or more support portions comprising slots configured to receive and support the first head radiating portion and the second head radiating portion.

Clause 49. The antenna assembly of any of Clauses 34-48, wherein the cover and the internal ground plane when coupled define an internal compact volume of less than 30 cubic inches.

Clause 50. The antenna assembly of any of Clauses 34-49, wherein the internal ground plane comprises a plurality of cable clamps configured to mechanically and electrically couple outer conductors of coaxial cables to the internal ground plane.

ADDITIONAL CONSIDERATIONS AND TERMINOLOGY

Features, materials, characteristics, or groups described in conjunction with a particular aspect, implementation, or example are to be understood to be applicable to any other aspect, implementation or example described herein unless incompatible therewith. All of the features disclosed in this specification (including any accompanying claims, abstract and drawings), or all of the steps of any method or process so disclosed, may be combined in any combination, except combinations where at least some of such features or steps are mutually exclusive. The protection is not restricted to the details of any foregoing implementations. The protection extends to any novel one, or any novel combination, of the features disclosed in this specification (including any accompanying claims, abstract and drawings), or to any novel one, or any novel combination, of the steps of any method or process so disclosed.

While certain implementations have been described, these implementations have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some implementations, the actual steps taken in the processes illustrated or disclosed may differ from those shown in the figures. Depending on the implementation, certain of the steps described above may be removed, others may be added. For example, the actual steps or order of steps taken in the disclosed processes may differ from those shown in the figure. Depending on the implementation, certain of the steps described above may be removed, others may be added. Furthermore, the features and attributes of the specific implementations disclosed above may be combined in different ways to form additional implementations, all of which fall within the scope of the present disclosure.

Although the present disclosure includes certain implementations, examples and applications, it will be understood by those skilled in the art that the present disclosure extends beyond the specifically disclosed implementations to other alternative implementations or uses and obvious modifications and equivalents thereof, including implementations which do not provide all of the features and advantages set forth herein. Accordingly, the scope of the present disclosure is not intended to be limited by the described implementations, and may be defined by claims as presented herein or as presented in the future.

Conditional language, such as "can," "could," "might," or "may," unless specifically stated otherwise, or otherwise understood within the context as used, is generally intended to convey that certain implementations include, while other implementations do not include, certain features, elements, or steps. Thus, such conditional language is not generally intended to imply that features, elements, or steps are in any way required for one or more implementations or that one or more implementations necessarily include logic for deciding, with or without user input or prompting, whether these features, elements, or steps are included or are to be performed in any particular implementation. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Likewise, the term "and/or" in reference to a list of two or more items, covers all of the following interpretations of the word: any one of the items in the list, all of the items in the list, and any combination of the items in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain implementations require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

What is claimed is:

1. A method of assembling an antenna assembly, the method comprising:

coupling one or more radiating elements in a first configuration to an internal ground plane; and positioning a cover on the internal ground plane, with the one or more radiating elements positioned between the cover and the internal ground plane, wherein positioning the cover on the internal ground plane causes at least a first radiating element of the one or more radiating elements to move to a second configuration, wherein in the first configuration, the first radiating element is substantially flat, wherein in the second configuration, the first radiating element has a three-dimensional shape.

2. The method of claim 1, wherein the one or more radiating elements comprise one or more PCB portions, the one or more PCB portions comprising flex circuits.

3. The method of claim 2, wherein the cover comprises a plurality of ribs formed on internal surfaces of one or more side walls of the cover, the plurality of ribs configured to engage the one or more radiating elements.

4. The method of claim 3, wherein the plurality of ribs are configured as catch points for the one or more radiating elements, wherein engagement between one or more of the plurality of ribs and the first radiating element causes the first radiating element to move from the first configuration to the second configuration during assembly of the antenna assembly.

5. The method of claim 3, wherein the plurality of ribs support the one or more radiating elements in a desired orientation relative to the internal ground plane.

6. The method of claim 3, wherein the one or more radiating elements further comprise a second radiating element and a third radiating element.

7. The method of claim 6, wherein the first radiating element and the second radiating element are configured for communication between approximately 450 MHz and 8 GHz and the third radiating element is configured for communication between approximately 1 GHz and 8 GHz.

8. The method of claim 6, wherein the first radiating element comprises a first upright radiating portion and a first head radiating portion and the second radiating element comprises a second upright radiating portion and a second head radiating portion, the first upright radiating portion is substantially orthogonal to the first head radiating portion and the second upright radiating portion is substantially orthogonal to the second head radiating portion.

9. The method of claim 8, wherein the cover comprises one or more support portions extending inwardly from a top wall of the cover towards the internal ground plane, the one or more support portions comprising slots configured to receive and support the first head radiating portion and the second head radiating portion.

10. The method of claim 1, wherein the internal ground plane comprises a plurality of cable clamps configured to mechanically and electrically couple outer conductors of coaxial cables to the internal ground plane.

11. An antenna assembly comprising:
- a cover comprising one or more side walls and a top wall;
- an internal ground plane, the internal ground plane comprising a base of the antenna assembly, the internal ground plane configured to couple to the cover; and
- a multi-band antenna positioned between the cover and the internal ground plane, the multi-band antenna comprising one or more radiating elements comprising:
  - a first radiating element formed on a first PCB portion, the first radiating element comprising a first upright radiating portion and a first head radiating portion;
  - wherein the first radiating element is configured to move from a first configuration prior to engagement with the cover to a second configuration when the cover is coupled to the internal ground plane, wherein in the first configuration the first upright radiating portion is coplanar to the first head radiating portion, wherein in the second configuration, the first upright radiating portion is at an angle relative to the first head radiating portion.

12. The antenna assembly of claim 11, wherein the first PCB portion comprises a flex circuit.

13. The antenna assembly of claim 11, wherein the cover comprises a plurality of ribs formed on internal surfaces of the one or more side walls, the plurality of ribs configured to engage the one or more radiating elements.

14. The antenna assembly of claim 13, wherein the plurality of ribs are configured as catch points for the one or more radiating elements, wherein engagement between one or more of the plurality of ribs and the first radiating element causes the first radiating element to move from the first configuration to the second configuration.

15. The antenna assembly of claim 14, wherein the plurality of ribs support the one or more radiating elements in a desired orientation relative to the internal ground plane.

16. The antenna assembly of claim 11, wherein the one or more radiating elements further comprise a second radiating element formed on a second PCB portion and a third radiating element formed on a third PCB portion, the second radiating element comprising a second upright radiating portion and a second head radiating portion.

17. The antenna assembly of claim 16, wherein the first radiating element and the second radiating element are configured for communication between approximately 450 MHz and 8 GHz and the third radiating element is configured for communication between approximately 1 GHz and 8 GHz.

18. The antenna assembly of claim 16, wherein the first upright radiating portion is substantially orthogonal to the first head radiating portion and the second upright radiating portion is substantially orthogonal to the second head radiating portion.

19. The antenna assembly of claim 16, wherein the cover comprises one or more support portions extending inwardly from the top wall towards the internal ground plane, the one or more support portions comprising slots configured to receive and support the first head radiating portion and the second head radiating portion.

20. The antenna assembly of claim 11, wherein the internal ground plane comprises a plurality of cable clamps configured to mechanically and electrically couple outer conductors of coaxial cables to the internal ground plane.

* * * * *